(12) United States Patent
Kassir et al.

(10) Patent No.: US 11,470,449 B2
(45) Date of Patent: Oct. 11, 2022

(54) POSITION MESSAGE UPDATE RATE ADAPTATION FOR VEHICLE-TO-PEDESTRIAN COMMUNICATIONS

(71) Applicant: QUALCOMM Incorporated, San Diego, CA (US)

(72) Inventors: Saadallah Kassir, Austin, TX (US); Anantharaman Balasubramanian, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 17/103,840

(22) Filed: Nov. 24, 2020

(65) Prior Publication Data

US 2022/0167120 A1     May 26, 2022

(51) Int. Cl.
*H04W 24/00* (2009.01)
*H04W 4/029* (2018.01)
*H04W 4/02* (2018.01)
*H04W 4/44* (2018.01)
*H04W 52/02* (2009.01)

(52) U.S. Cl.
CPC .......... *H04W 4/029* (2018.02); *H04W 4/023* (2013.01); *H04W 4/44* (2018.02); *H04W 52/0216* (2013.01)

(58) Field of Classification Search
CPC ....... H04W 4/029; H04W 4/44; H04W 4/023; H04W 52/0216
See application file for complete search history.

(56) References Cited

U.S. PATENT DOCUMENTS

| | | | |
|---|---|---|---|
| 9,253,753 B2* | 2/2016 | Rubin | H04W 4/027 |
| 2011/0070896 A1* | 3/2011 | Persico | G01S 5/0294 |
| | | | 455/456.1 |

FOREIGN PATENT DOCUMENTS

| | | | | |
|---|---|---|---|---|
| FR | 3076679 A1 * | 7/2019 | | B64D 45/00 |
| WO | WO-2016209197 A1 * | 12/2016 | | H04L 67/12 |
| WO | WO-2020261908 A1 * | 12/2020 | | |

* cited by examiner

*Primary Examiner* — Erika A Washington
(74) *Attorney, Agent, or Firm* — Harrity & Harrity, LLP

(57) ABSTRACT

Various aspects of the present disclosure generally relate to wireless communication. In some aspects, an apparatus for wireless communication at a user equipment (UE) may transmit, to at least one vehicle UE, in accordance with a first update rate, a first set of position messages indicating position information associated with the UE. The apparatus may transmit a second set of position messages in accordance with a second update rate. Numerous other aspects are provided.

30 Claims, 19 Drawing Sheets

POSITION MESSAGE UPDATE RATE ADAPTATION FOR VEHICLE-TO-PEDESTRIAN COMMUNICATIONS

FIELD OF THE DISCLOSURE

Aspects of the present disclosure generally relate to wireless communication and to techniques and apparatuses for position message update rate adaptation for vehicle-to-pedestrian communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, an apparatus for wireless communication at a user equipment (UE) for wireless communication includes a memory and one or more processors coupled to the memory, the memory and the one or more processors configured to: transmit to at least one vehicle UE, in accordance with a first update rate, a first set of position messages indicating position information associated with the UE; and transmit a second set of position messages in accordance with a second update rate.

In some aspects, an apparatus for wireless communication at a UE for wireless communication includes a memory and one or more processors coupled to the memory, the memory and the one or more processors configured to: transmit, to a pedestrian UE and based at least in part on a determination that an update request condition is satisfied, an update request message indicating a request for position information associated with the pedestrian UE; and receive, from the pedestrian UE, a position message based at least in part on the request for position information.

In some aspects, an apparatus for wireless communication at a UE for wireless communication includes a memory and one or more processors coupled to the memory, the memory and the one or more processors configured to: transmit to at least one vehicle UE, in accordance with a first discontinuous transmission and reception cycle, a first set of position messages indicating position information associated with the UE and at least one additional UE; and receive, from the at least one additional UE and in accordance with a second discontinuous transmission and reception cycle, a second set of position messages indicating position information associated with the at least one additional UE.

In some aspects, an apparatus for wireless communication at a UE for wireless communication includes a memory and one or more processors coupled to the memory, the memory and the one or more processors configured to: receive, from a vehicle UE and based at least in part on a determination that an update request condition is satisfied, an update request message indicating a request for position information associated with the UE; and transmit, to the vehicle UE, a position message based at least in part on the request for position information.

In some aspects, a first apparatus for wireless communication at a first UE for wireless communication includes a memory and one or more processors coupled to the memory, the memory and the one or more processors configured to: determine that a second UE comprises a cluster head for a cluster of UEs that includes the first UE and the second UE; and transmit, to the second UE and in accordance with a discontinuous transmission and reception cycle, a set of position messages indicating position information associated with the first UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
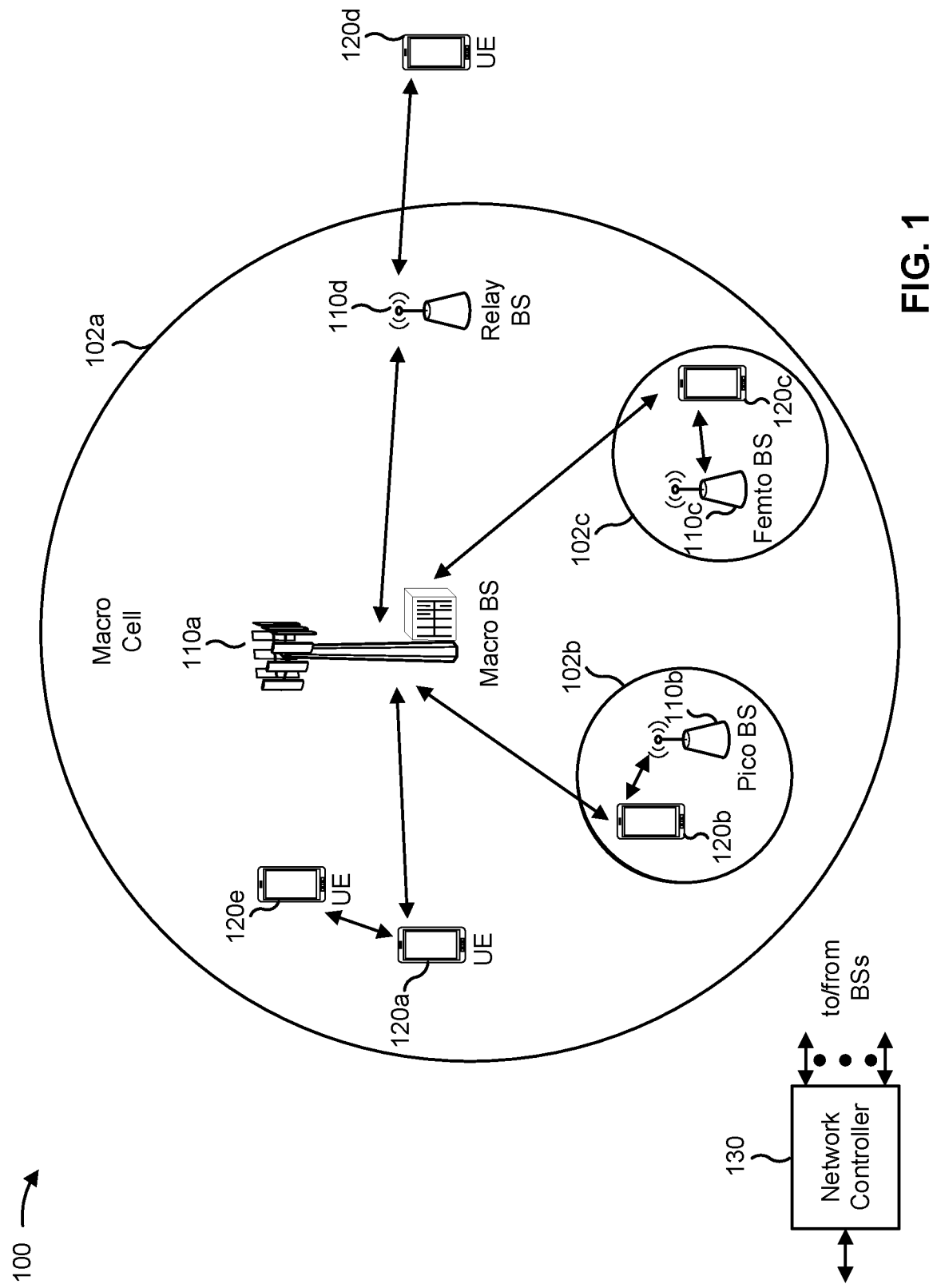
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
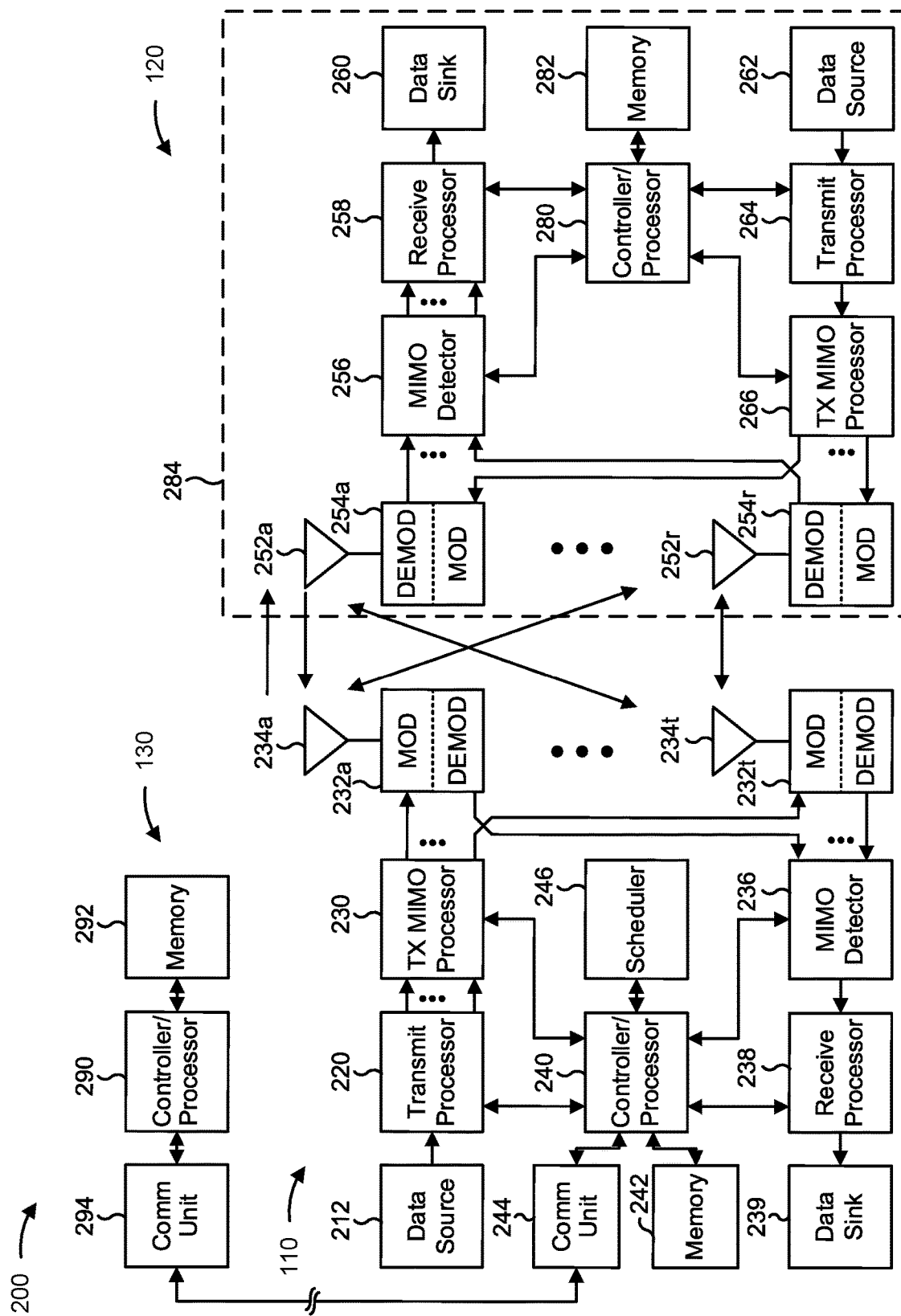
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-18.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-18.

Controller/processor 240 of base station 110, controller/processor 280 of UE 120, and/or any other component(s) of FIG. 2 may perform one or more techniques associated with position message update rate adaptation for vehicle-to-pedestrian communications, as described in more detail elsewhere herein. For example, controller/processor 240 of base station 110, controller/processor 280 of UE 120, and/or any other component(s) of FIG. 2 may perform or direct operations of, for example, process 1400 of FIG. 14, process 1500 of FIG. 15, process 1600 of FIG. 16, process 1700 of FIG. 17, process 1800 of FIG. 18, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 15, process 1600 of FIG. 16, process 1700 of FIG. 17, process 1800 of FIG. 18, and/or other processes as described herein. In some aspects, executing instructions may include running the instructions, converting the instructions, compiling the instructions, and/or interpreting the instructions, among other examples.

In some aspects, the apparatus includes means for transmitting to at least one vehicle UE, in accordance with a first update rate, a first set of position messages indicating position information associated with the UE; and/or means for transmitting a second set of position messages in accordance with a second update rate. In some aspects, the means for the apparatus to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the apparatus includes means for determining the second update rate based at least in part on position information associated with one or more vehicles. In some aspects, the apparatus includes means for receiving the position information associated with the one or more vehicles from the one or more vehicles. In some aspects, the apparatus includes means for receiving the position information associated with the one or more vehicles from a roadside unit. In some aspects, the apparatus includes means for receiving environmental information associated with the one or more vehicles from a roadside unit.

In some aspects, the apparatus includes means for receiving, from the at least one vehicle UE, at least one update rate request message indicating at least one requested minimum update rate; and/or means for determining the second update rate based at least in part on the at least one requested minimum update rate. In some aspects, the apparatus includes means for receiving, from a first vehicle UE, a first update rate request message indicating a first minimum update rate; means for receiving, from a second vehicle UE, a second update rate request message indicating a second minimum update rate; and/or means for determining the second update rate based at least in part on the first minimum update rate and the second minimum update rate. In some aspects, the apparatus includes means for receiving, from a roadside unit, an indication of the second update rate.

In some aspects, the apparatus includes means for transmitting, to a pedestrian UE and based at least in part on a determination that an update request condition is satisfied, an update request message indicating a request for position information associated with the pedestrian UE; and/or means for receiving, from the pedestrian UE, a position message based at least in part on the request for position information. In some aspects, the means for the apparatus to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the apparatus includes means for determining a predicted path of the UE; means for determining a predicted location of the pedestrian UE; and/or means for determining that the predicted location of the pedestrian UE intersects the predicted path of the UE.

In some aspects, the apparatus includes means for transmitting to at least one vehicle UE, in accordance with a first discontinuous transmission and reception cycle, a first set of position messages indicating position information associated with the UE and at least one additional UE; and/or means for receiving, from the at least one additional UE and in accordance with a second discontinuous transmission and reception cycle, a second set of position messages indicating position information associated with the at least one additional UE. In some aspects, the means for the apparatus to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the apparatus includes means for determining that the UE is a cluster head for a cluster of UEs that includes the UE and the at least one additional UE. In some aspects, the apparatus includes means for receiving at least one status indication from the at least one additional UE; and/or means for identifying the cluster of UEs based at least in part on the at least one status indication. In some aspects, the apparatus includes means for receiving at least one status prediction from a roadside unit; and/or means for identifying the cluster of UEs based at least in part on the at least one status prediction.

In some aspects, the apparatus includes means for receiving at least one clustering signal from the at least one additional UE; and/or means for identifying the cluster of UEs based at least in part on the at least one clustering signal. In some aspects, the apparatus includes means for receiving at least one position message from the at least one additional UE; and/or means for identifying the cluster of UEs based at least in part on the at least one position message. In some aspects, the apparatus includes means for determining one or more UE IDs corresponding to the at least one additional UE; and/or means for determining that a UE ID corresponding to the UE has a value that is greater than a value of any of the one or more UE IDs, In some aspects, the apparatus includes means for receiving, from a vehicle UE and based at least in part on a determination that an update request condition is satisfied, an update request message indicating a request for position information associated with the UE; and/or means for transmitting, to the vehicle UE, a position message based at least in part on the request for position information. In some aspects, the means for the apparatus to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first apparatus includes means for determining that a second UE comprises a cluster head for a cluster of UEs that includes the first UE and the second UE; and/or means for transmitting, to the second UE and in accordance with a discontinuous transmission and reception cycle, a set of position messages indicating position information associated with the first UE. In some aspects, the means for the first apparatus to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first apparatus includes means for receiving at least one status indication from the second UE; and/or means for identifying the cluster of UEs based at least in part on the at least one status indication. In some aspects, the first apparatus includes means for receiving at least one status prediction from a roadside unit; and/or means for identifying the cluster of UEs based at least in part on the at least one status prediction.

In some aspects, the first apparatus includes means for receiving at least one clustering signal from the second UE;

and/or means for identifying the cluster of UEs based at least in part on the at least one clustering signal. In some aspects, the first apparatus includes means for receiving at least one position message from the second UE; and/or means for identifying the cluster of UEs based at least in part on the at least one position message. In some aspects, the first apparatus includes means for determining a first UE identifier (ID) corresponding to the first UE; means for determining a second UE ID corresponding to the second UE; and/or means for determining that the second UE ID has a value that is greater than a value of the first UE ID.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
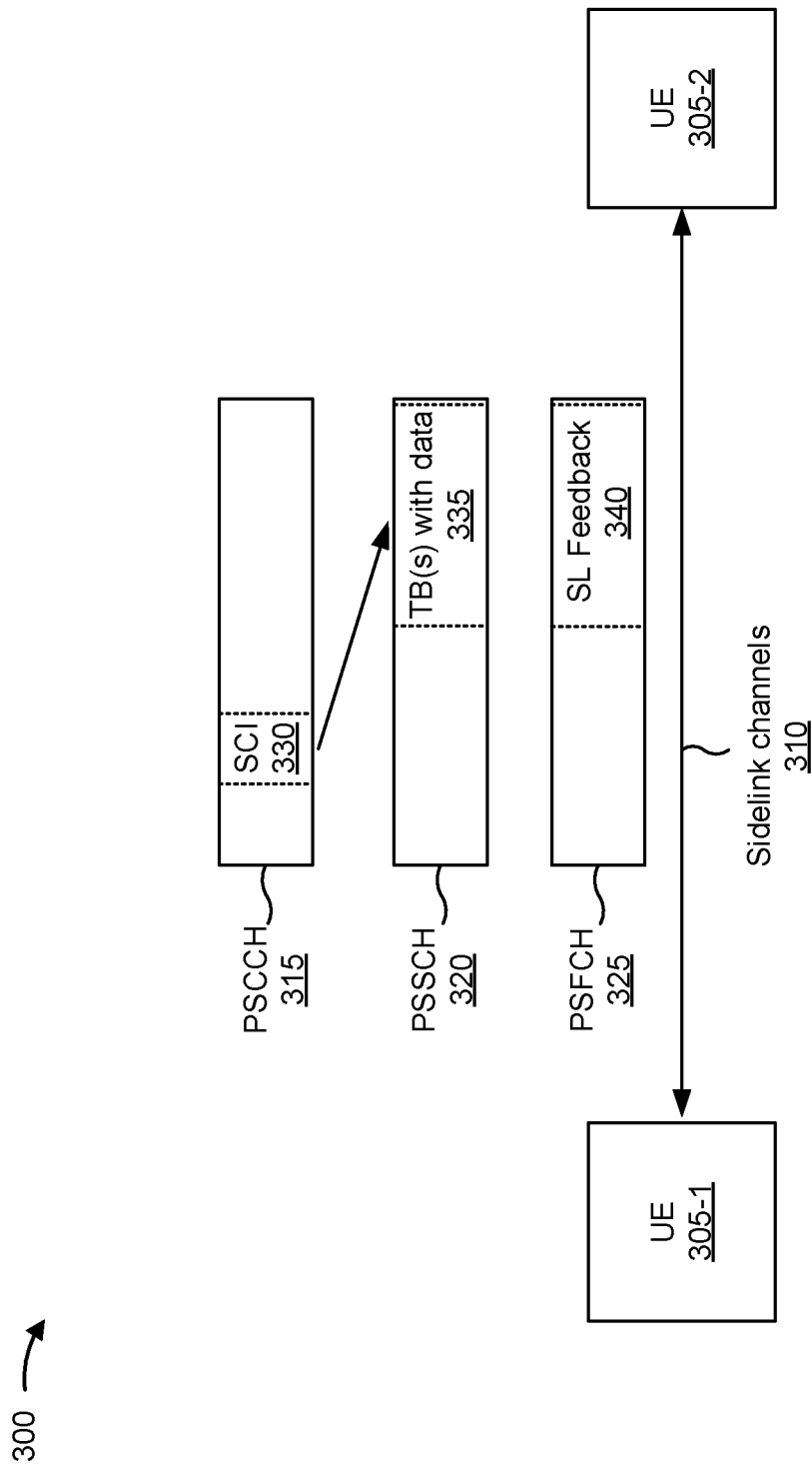
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
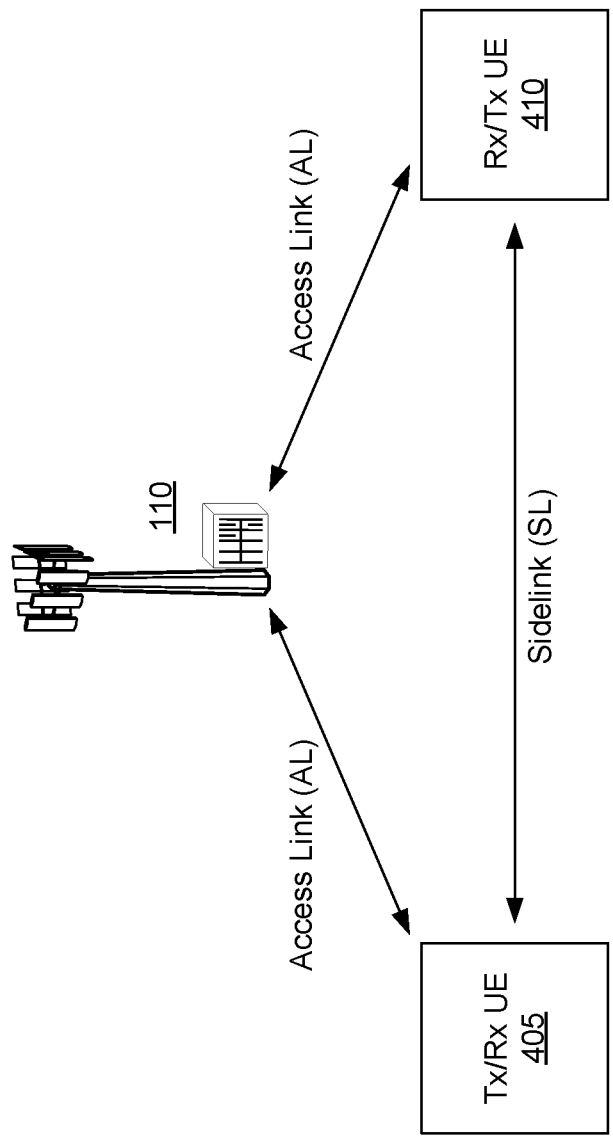
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
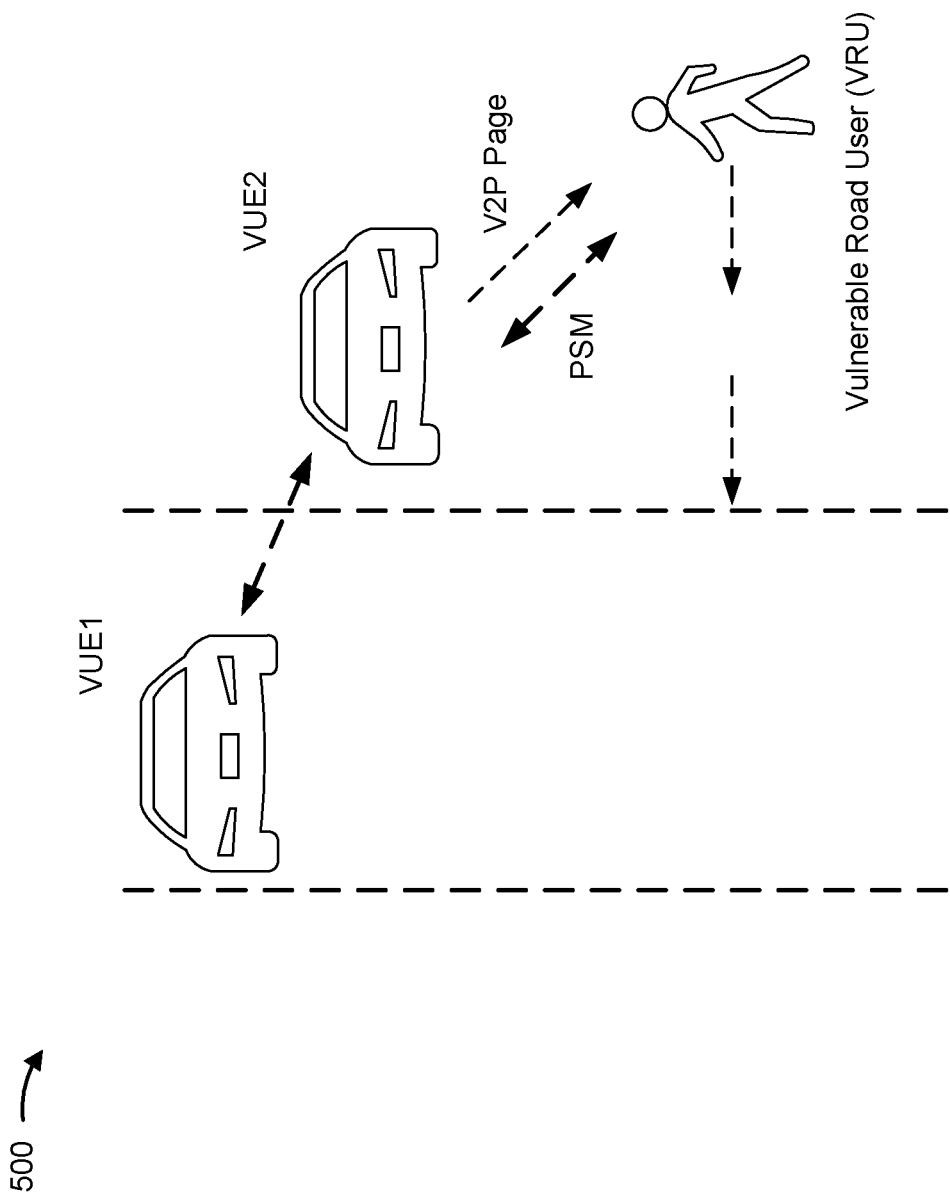
FIGS. 5 and 6 are diagrams illustrating examples associated with vehicle-to-pedestrian communications, in accordance with various aspects of the present disclosure.

FIG. 5 is a diagram illustrating an example 500 associated with vehicle-to-pedestrian communications, in accordance with various aspects of the present disclosure.

As shown, a first vehicle may have an associated vehicle UE ("VUE1") and a second vehicle may have an associated vehicle UE ("VUE2"). The VUE1 and VUE2 may exchange information such as position information and/or motion information, among other examples. As is further shown, the VUE2 may be configured to communicate with a pedestrian UE (PUE) associated with a pedestrian (which may be referred to, for example, as a vulnerable road user (VRU)). In some cases, the VUE1 may communicate with the PUE. The VUE1 and/or the VUE2 may communicate with the PUE via a vehicle-to-pedestrian (V2P) system. The V2P system may be configured to facilitate the pedestrian's safety.

In some cases, for example, VUE2 may track the position and velocity of PUEs (associated with VRUs) in its surroundings and may transmit a warning indication to vulnerable pedestrians if a collision is predicted. To enable tracking of the VRU, the PUE may transmit its position (e.g., obtained through GPS) to the VUE2 periodically using a public safety message (PSM) along with its identity. VRU tracking should be accurate to ensure an accurate prediction of a potential collision. Clearly, the more frequently the VRU sends updates (PSMs), the more accurately it can be tracked. However, sending frequent PSMs may result in unnecessarily rapid battery drainage and low spectrum efficiency.

As indicated above, FIG. 5 is provided as an example. Other examples may differ from what is described with respect to FIG. 5.

Figure 6:
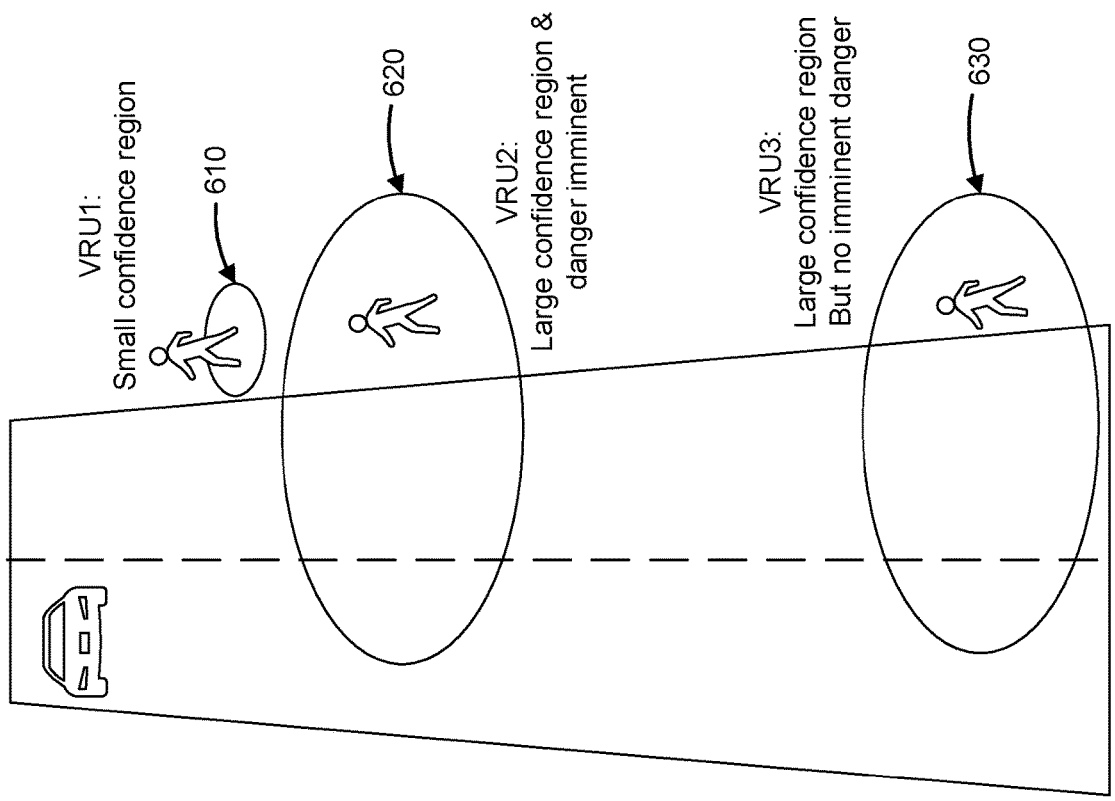

FIG. 6 is a diagram illustrating an example 600 associated with vehicle-to-pedestrian communications, in accordance with various aspects of the present disclosure. As shown, a VUE may be configured to track a VRU1, a VRU2, and a VRU3. In some cases, the VUE, the VRU1, the VRU2, and/or the VRU3 may communicate with one another using a V2P system.

In some cases, a VUE may track pedestrians (e.g., the illustrated VRUs) using a Kalman filter that predicts a VRU's location within some confidence region, characterized by an error covariance matrix. For example, as shown, the VRU1 has a smaller confidence region 610 than a confidence region 620 associated with the VRU2 and a confidence region 630 associated with the VRU3. Between any two position information transmissions, the confidence region may widen over time due to uncertainty in the VRU's displacement. Frequent updates may prevent the confidence region from growing too large. The VRU3, which may be farther from the vehicle than the VRU1 and the VRU2, may be in no imminent danger of impact, due to the distance between the VRU3 and the vehicle. Accordingly, frequent transmissions of position information messages may be unnecessary for the VRU3 and may lead to increased power consumption and communication traffic.

Aspects of the techniques and apparatuses described herein provide for position message update rate adaptation for vehicle-to-pedestrian communications. In some aspects, for example, a PUE may change an update rate at which the position information is transmitted. In some aspects, the new update rate may be based at least in part on position information associated with vehicles, transmissions from one or more roadside units, and/or requested minimum update rates received from VUEs. In some aspects, the PUE may transmit position information only in response to a request received from a VUE. In some aspects, a cluster of UEs may be able to determine a cluster head that can communicate with a VUE. In this way, PUEs may transmit position information less frequently. As a result, aspects may facilitate reducing power consumption and communication traffic.

As indicated above, FIG. 6 is provided as an example. Other examples may differ from what is described with respect to FIG. 6.

Figure 7:
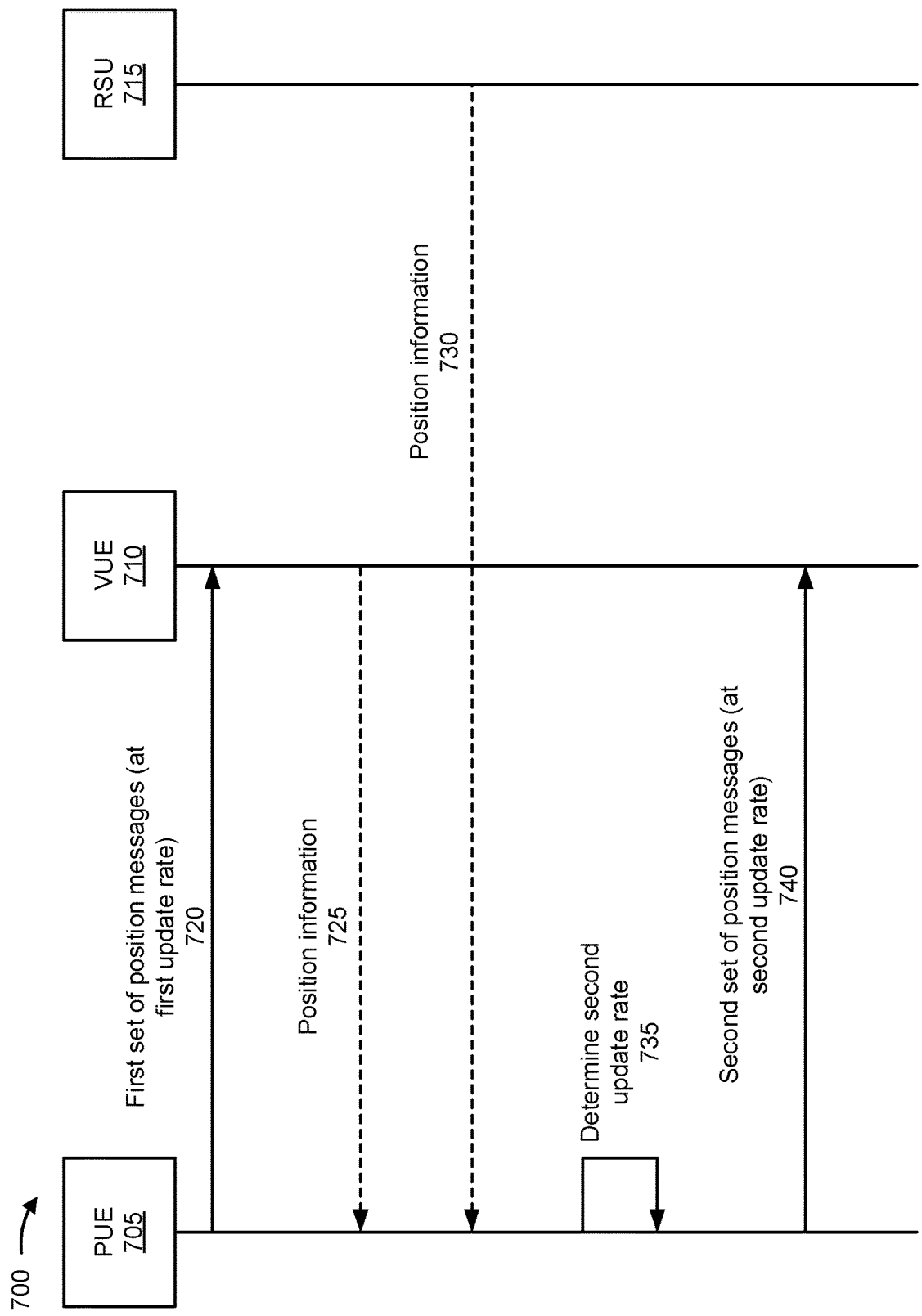
FIGS. 7-13 are diagrams illustrating examples associated with position message update rate adaptation for vehicle-to-pedestrian communications, in accordance with various aspects of the present disclosure.

FIG. 7 is a diagram illustrating an example 700 associated with position message update rate adaptation for vehicle-to-pedestrian communications, in accordance with various aspects of the present disclosure. As shown in FIG. 7, a PUE 705, a VUE 710, and a roadside unit (RSU) 715 may communicate with one another via a sidelink network.

As shown by reference number 720, the PUE 705 may transmit a first set of position messages to the VUE 710. In some aspects, the PUE 705 may transmit the first set of position messages to any number of other UEs. For example, the PUE 705 may broadcast the first set of position messages (e.g., using one or more PSMs). The PUE 705 may transmit the first set of position messages in accordance with a first update rate. The first set of position messages may indicate position information associated with the PUE 705.

As shown by reference number 725, the VUE 710 may transmit, and the PUE 705 may receive, position information associated with the VUE 710. In some aspects, the PUE 705 may receive position information from any number of different VUEs. As shown by reference number 730, the RSU 715 may transmit, and the PUE 705 may receive, position information associated with the VUE 710 (and/or other VUEs) from the RSU 715. For example, in some aspects, the RSU 715 (and/or additional RSUs) may be used to provide RSU-assisted environment awareness for PUEs. The RSU 715 (and/or other RSUs) may track the VUE 710 (and/or other VUEs) and send data to the PUE 705 about the environment (e.g., the number of VUEs within a certain distance of the PUE 705, the positions of the VUEs, and/or the velocities and/or accelerations of the VUEs, among other examples).

As shown by reference number 735, the PUE 705 may determine a second update rate. In some aspects, the PUE 705 may determine the second update rate based at least in part on position information associated with one or more VUEs (e.g., the VUE 710). For example, in some aspects, the PUE 705 receives information about surrounding vehicles such as VUE 710. If the PUE 705 is far enough from all of those vehicles (e.g., if a user associated with the PUE 705 is walking in a small unfrequented alley or parallel to a busy street), the PUE 705 may determine not to send any position information, or the PUE 705 may send position information at a slower rate than a rate at which the PUE 705 may send position information when the PUE 705 is closer to one or more vehicles.

In some aspects, as indicated above, the PUE 705 may receive environmental information associated with the one or more vehicles (including the VUE 710) from the RSU 715. The PUE 705 may determine the second update rate based at least in part on the environmental information. In some aspects, as explained in further detail below in connection with FIG. 8, the PUE 705 may receive, from the VUE 710 (and/or other VUEs), at least one update rate request message indicating at least one requested minimum update rate. The PUE 705 may determine the second update rate based at least in part on the at least one requested minimum update rate.

In some aspects, RSUs may also be leveraged to make centralized decisions and reduce computations performed by the PUE 705. In some aspects, for example, the RSU 715 may track VUEs and/or PUEs independently, and may request the PUE 705 to use a new update rate based on information about VUEs and/or PUEs. The RSU 715 may notify VUE 710 of nearby PUEs (e.g., PUE 705). In some aspects, the RSU 715 may determine a second update rate and may transmit the second update rate to the PUE 705.

As shown by reference number 740, the PUE 705 may transmit a second set of position messages in accordance with the second update rate. In some aspects, the PUE 705 may transmit a second set of position messages by broadcasting a plurality of PSMs. The PUE 705 may continually transmit sets of position messages in accordance with the second update rate until the PUE 705 determines that an environment of the PUE 705 has changed such that a new update rate should be determined (e.g., the user associated with the PUE 705 moves closer to a road, additional VUEs are detected, one or more VUEs speed up, and/or other examples).

As described above, one or more aspects facilitate adapting a position message update rate based at least in part on a change in environment of a PUE. In this way, aspects may facilitate increasing the battery life of the PUE, increasing efficiency of use of the wireless spectrum, and/or increasing privacy by reducing the frequency of transmission of position information.

As indicated above, FIG. 7 is provided as an example. Other examples may differ from what is described with respect to FIG. 7.

Figure 8:
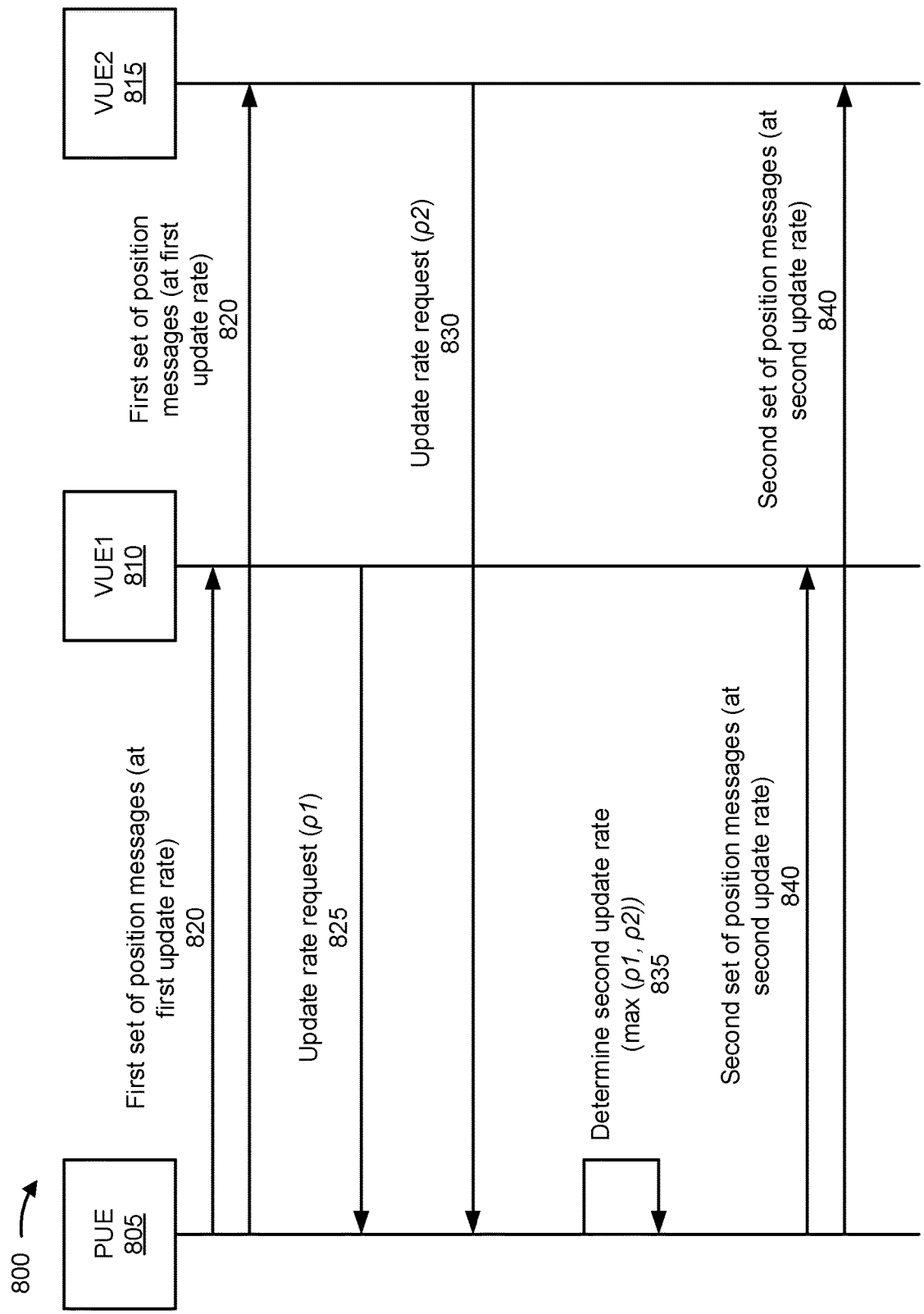

FIG. 8 is a diagram illustrating an example 800 associated with position message update rate adaptation for vehicle-to-pedestrian communications, in accordance with various aspects of the present disclosure. As shown in FIG. 8, a PUE 805, a first VUE ("VUE1") 810, and a second VUE ("VUE2") 815 may communicate with one another via a sidelink network. One or more aspects of the example 800 may include any number of aspects described in connection with FIG. 7.

As shown by reference number 820, the PUE 805 may transmit, and the VUE1 810 and the VUE2 820 may receive, a first set of position messages indicating position information associated with the UE. The first set of position messages may be transmitted in accordance with a first update rate. As shown by reference number 825, the VUE1 810 may transmit, and the PUE 805 may receive, a first update rate request message indicating a first minimum update rate, $\rho 1$. As shown by reference number 830, the VUE 815 may transmit, and the PUE 805 may receive, a second update rate request message indicating a second minimum update rate, $\rho 2$.

As shown by reference number 835, the PUE 805 may determine the second update rate based at least in part on the first minimum update rate $\rho 1$ and the second minimum update rate $\rho 2$. For example, in some aspects, the second update rate R comprises a maximum of the first minimum update rate and the second minimum update rate: $R=\max(\rho 1, \rho 2)$. In this way, vehicles may provide a minimum update rate that is configured to facilitate predicting collisions with high reliability.

As shown by reference number 840, the PUE 805 may transmit a second set of position messages in accordance with the second update rate. For example, in some aspects, the PUE 805 may broadcast the position messages using a plurality of PSMs. In this way, aspects may facilitate dynamic adjustment of update rates.

As indicated above, FIG. 8 is provided as an example. Other examples may differ from what is described with respect to FIG. 8.

Figure 9:
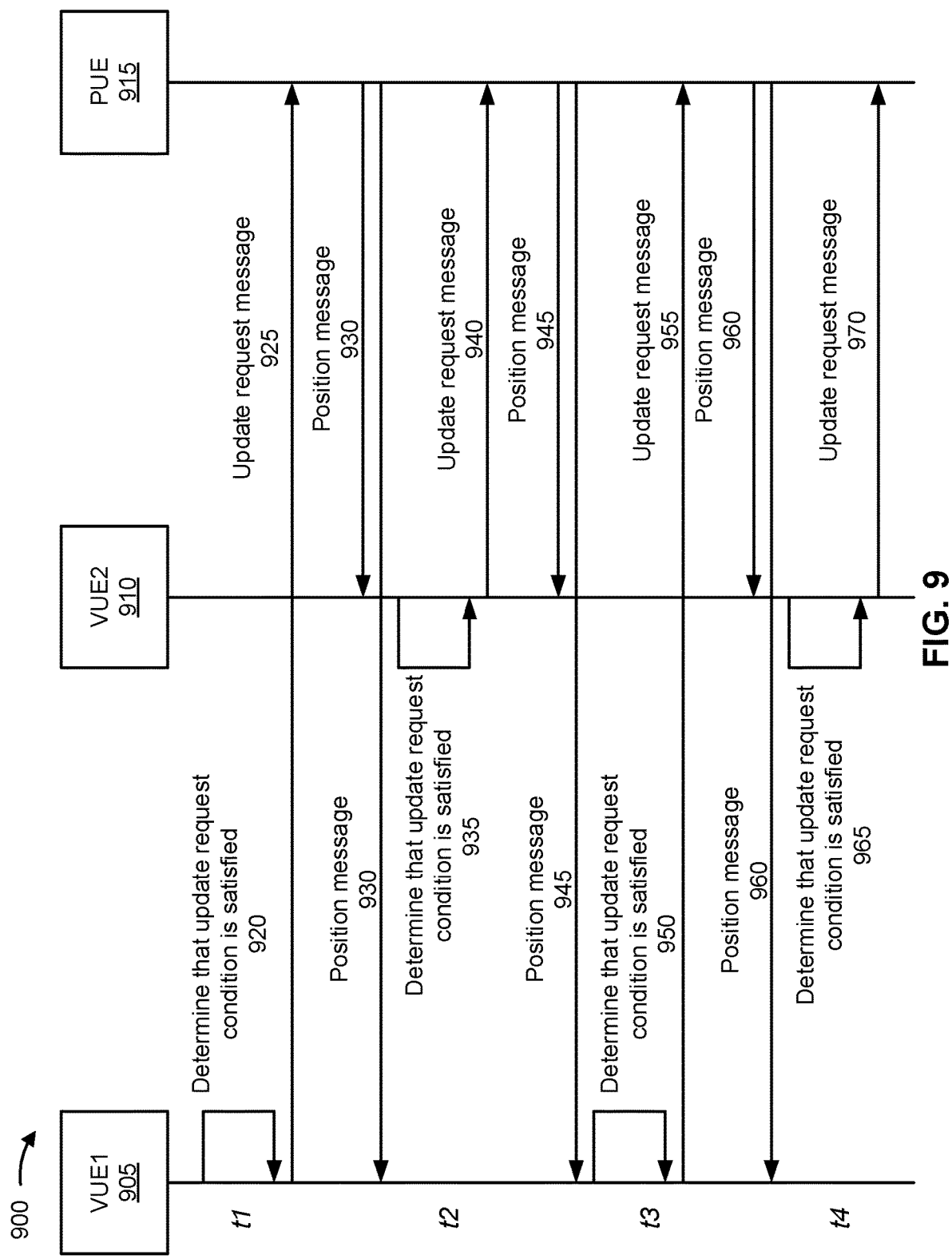

FIG. 9 is a diagram illustrating an example 900 associated with position message update rate adaptation for vehicle-to-pedestrian communications, in accordance with various aspects of the present disclosure. As shown in FIG. 9, a first VUE ("VUE1") 905, a second VUE ("VUE2") 910, and a PUE 915 may communicate with one another via a sidelink network.

As shown by reference number 920, the VUE1 905 may determine that an update request condition is satisfied at a first time, t1. For example, in some aspects, the VUE1 may keep track of the PUE 915 based at least in part on a position estimate (e.g., a predicted location). This position estimate may be noisy and have a confidence region. The VUE1 905 may initiate an update request when the confidence region corresponding to the location estimate of the PUE 915 overlaps with a predicted path of the VUE1 905. For example, the VUE1 905 may determine a predicted path of the VUE1 and may determine a predicted location of the PUE 915.

The VUE1 905 may determine that the predicted location of the pedestrian UE intersects the predicted path of the UE. In some aspects, the VUE1 905 may determine the predicted location of the PUE 915 comprises receiving, from an RSU, an indication of the predicted location of the PUE. As shown by reference number 920, the VUE1 905 may transmit, to the PUE 915, and based at least in part on a determination that an update request condition is satisfied, an update request message indicating a request for position information associated with the PUE 915.

As shown by reference number 930, the PUE 915 may transmit, and the VUE1 and/or the VUE2 may receive, a position message based at least in part on the request for position information. For example, the PUE 915 may transmit the position message as a broadcast message.

As shown by reference number 935, the VUE2 910 may determine, at a second time, t2, that an update request condition is satisfied. In some aspects, the VUE2 910 may utilize any number of aspects of procedures described above in connection with determining that an update request condition is satisfied. As shown by reference number 940, the VUE2 910 may transmit, to the PUE 915 and based at least in part on a determination that an update request condition is satisfied, an update request message indicating a request for position information associated with the PUE 915. As shown by reference number 945, the PUE 915 may transmit, and the VUE1 905 and VUE2 910 may receive, a position message based at least in part on the request for position information.

As shown by reference number 950, the VUE1 905 may determine, at a third time, t3, that an update request condition is satisfied. As shown by reference number 955, the VUE1 905 may transmit an update request message. As shown by reference number 960, the PUE 915 may transmit, and the VUE1 905 may receive, a position message based at least in part on the request for position information.

As shown by reference number 965, the VUE2 910 may determine, at a fourth time, t4, that an update request condition is satisfied. As shown by reference number 970, the VUE1 905 may transmit, to the PUE 915 and based at least in part on a determination that an update request condition is satisfied, an update request message indicating a request for position information associated with the PUE 915.

As described above, aspects facilitate VUEs requesting data from PUEs. If a PUE is far enough from vehicles closest to the PUE, the VUE may decide not to send any position information or may decide to send position information at a slower rate, which may result in a decrease in unnecessary communication traffic and/or power consumption.

As indicated above, FIG. 9 is provided as an example. Other examples may differ from what is described with respect to FIG. 9.

Figure 10:
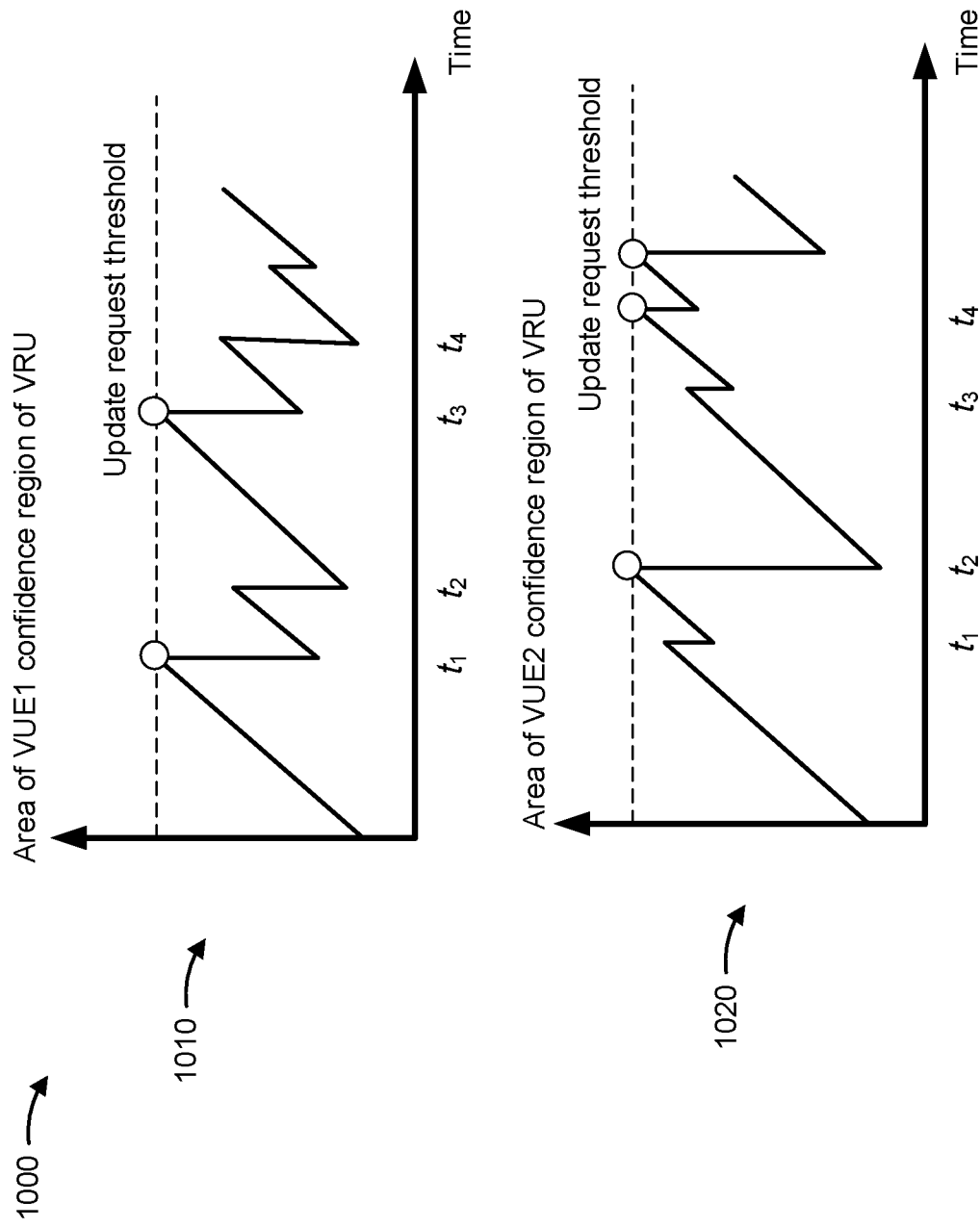

FIG. 10 is a diagram illustrating an example 1000 associated with position message update rate adaptation for vehicle-to-pedestrian communications, in accordance with various aspects of the present disclosure. A first graph 1010 shown in FIG. 10 depicts a relationship between a confidence region associated with the PUE 915 shown in FIG. 9 as calculated by the VUE1 905 shown in FIG. 9 and an update request condition. A second graph 1020 depicts a relationship between a confidence region associated with the PUE 915 shown in FIG. 9 as calculated by the VUE2 910 shown in FIG. 9 and an update request threshold.

As shown, the update request condition may be satisfied based at least in part on an area of the corresponding confidence region satisfying an update request threshold. For example, at t1, as shown in the graph 1010, the area of the confidence region calculated by VUE1 905 satisfies a corresponding update request threshold, thereby indicating to the VUE1 905 to transmit an update request message. At t2, as shown in the graph 1020, the area of the confidence region calculated by VUE2 910 satisfies a corresponding update request threshold, thereby indicating to the VUE2 910 to transmit an update request message. At t2, however, as shown in the graph 1010, the area of the confidence region calculated by VUE1 905 fails to satisfy the corresponding update request threshold and, accordingly, VUE1 905 does not transmit an update request at that time.

At t3, as shown in the graph 1010, the area of the confidence region calculated by VUE1 905 satisfies a corresponding update request threshold, thereby indicating to the VUE1 905 to transmit an update request message. At t4, as shown in the graph 1020, the area of the confidence region calculated by VUE2 910 satisfies a corresponding update request threshold, thereby indicating to the VUE2 910 to transmit an update request message. Again, shortly after t4, as shown in the graph 1020, the area of the confidence region calculated by VUE2 910 satisfies a corresponding update request threshold, thereby indicating to the VUE2 910 to transmit an update request message.

As indicated above, FIG. 10 is provided as an example. Other examples may differ from what is described with respect to FIG. 10. For example, any number of other update request conditions may be used such as aspects of a position of PUEs, positions of the VUE and/or other VUEs, traffic levels, average speeds of VUEs and/or maximum speeds of VUEs, among other examples.

Figure 11:
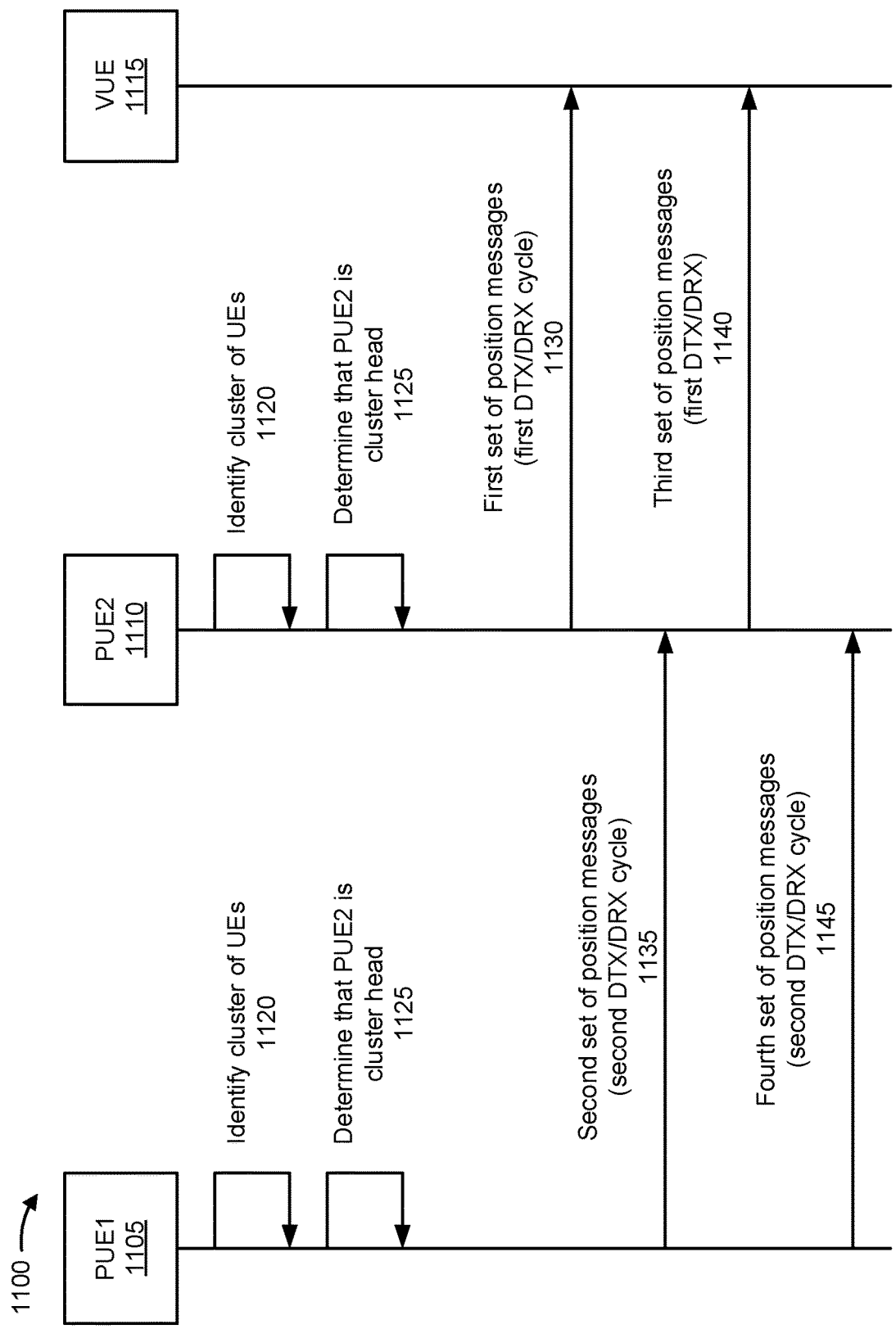

FIG. 11 is a diagram illustrating an example 1100 associated with position message update rate adaptation for vehicle-to-pedestrian communications, in accordance with various aspects of the present disclosure. As shown in FIG. 11, a first PUE ("PUE1") 1105, a second PUE ("PUE2") 1110, and a VUE 1115 may communicate with one another via a sidelink network.

As shown by reference number 1120, the PUE1 1105 and/or PUE2 1110 may identify a cluster of UEs. For example, a group of pedestrians walking close to one another and having corresponding PUEs may have a common motion (e.g., standing still in a group and/or moving in a common direction at a similar speed). In such a case, the corresponding PUEs may form a cluster and determine one of the PUEs to be a cluster head that may interact with one or more other devices (e.g., one or more VUEs and/or one or more RSUs) on behalf of the cluster.

In some aspects, the PUE1 1105 and/or PUE2 1110 may identify the cluster based at least in part on at least one status indication. A status indication may be an indication of a predicted trajectory of a PUE. For example, PUE2 1110 may determine (e.g., based on global positioning service (GPS) data, accelerometer measurements, historical data, calendar data, and/or other sensor data) a predicted trajectory of the PUE2 1110 and may provide an indication to the PUE1 1105 that indicates that predicted trajectory. In some aspects, the status indication may be broadcast by the PUE1 1105 and/or the PUE2 1110 in a PSM. In some aspects, an RSU may transmit the status indication to the PUE1 1105 and/or the PUE2 1110. In some aspects, the RSU may broadcast a status prediction. The RSU may predict a status (e.g., a predicted trajectory) of one or more PUEs based at least in part on position and/or motion information that the RSU receives from the one or more PUEs.

In some aspects, the PUE1 1105 and/or PUE2 1110 may receive at least one clustering signal from one or more other PUEs, and may identify the cluster of UEs based at least in part on the at least one clustering signal. In some aspects, the PUE 1 1105 and/or PUE2 1110 may receive at least one position message from one or more other PUEs, and may identify the cluster of UEs based at least in part on the at least one position message.

As shown by reference number 1125, the PUE1 1105 and/or the PUE2 1110 may determine that the PUE2 1110 is a cluster head for the identified cluster of UEs that includes the PUE1 1105 and the PUE2 1110. In some aspects, PUEs in a cluster may explicitly or implicitly elect a cluster head.

In some aspects, the PUE1 1105 and/or the PUE2 1110 may determine one or more UE identifiers (IDs) corresponding to the PUEs in the cluster. The PUE1 1105 and/or the PUE2 1110 may determine that a UE ID corresponding to the PUE2 1110 has a value that is greater than a value of any of the other one or more UE IDs. Determining that the UE is a cluster head for the cluster of UEs may be based at least in part on determining that the UE is a cluster head for the cluster of UEs based at least in part on determining that the UE ID corresponding to the UE has a value that satisfies a UE ID condition. A UE ID value may satisfy a UE ID condition where the value is greater than the value of any of the one or more UE IDs, where the value is greater than a lowest UE ID value, and/or where the value satisfies a UE ID value threshold, among other examples.

In some aspects, the PUE1 1105 and/or the PUE2 1110 may determine that the PUE2 1110 is a cluster head based at least in part on determining that the PUE2 1110 has a lowest UE ID value, by determining that the PUE2 1110 is positioned at the front of the cluster (e.g., is leading the group), has a highest transmission power, has a greatest remaining amount of power, and/or has a capability that satisfies a capability condition, among other examples.

As shown by reference number 1130, the PUE2 1110 may transmit to the VUE 1115, in accordance with a first discontinuous transmission and reception (DTX/DRX) cycle, a first set of position messages indicating position information associated with the PUE2 1110 and PUE1 1105. As shown by reference number 1135, the PUE2 1110 may receive, from the PUE1 1105, and in accordance with a second DTX/DRX cycle, a second set of position messages indicating position information associated with the PUE1 1105. In some aspects, the first DTX/DRX cycle corresponds to a first resource allocation indicating a first set of periodic slots that occur based on a first periodicity, and the second DTX/DRX cycle corresponds to a second resource allocation indicating a second set of periodic slots that occur based on a second periodicity. In some aspects, the first DTX/DRX cycle is independent of the second DTX/DRX cycle.

In some aspects, the first DTX/DRX cycle and the second DTX/DRX cycle are contiguous so that there is no gap between an end of a first active state corresponding to the first DTX/DRX cycle and a beginning of a second, adjacent, active state corresponding to the second DTX/DRX cycle. In some aspects, the second periodicity may be a multiple of the first periodicity. In some aspects, for example, the second periodicity may be two times the first periodicity.

As indicated above, FIG. 11 is provided as an example. Other examples may differ from what is described with respect to FIG. 11.

Figure 12:
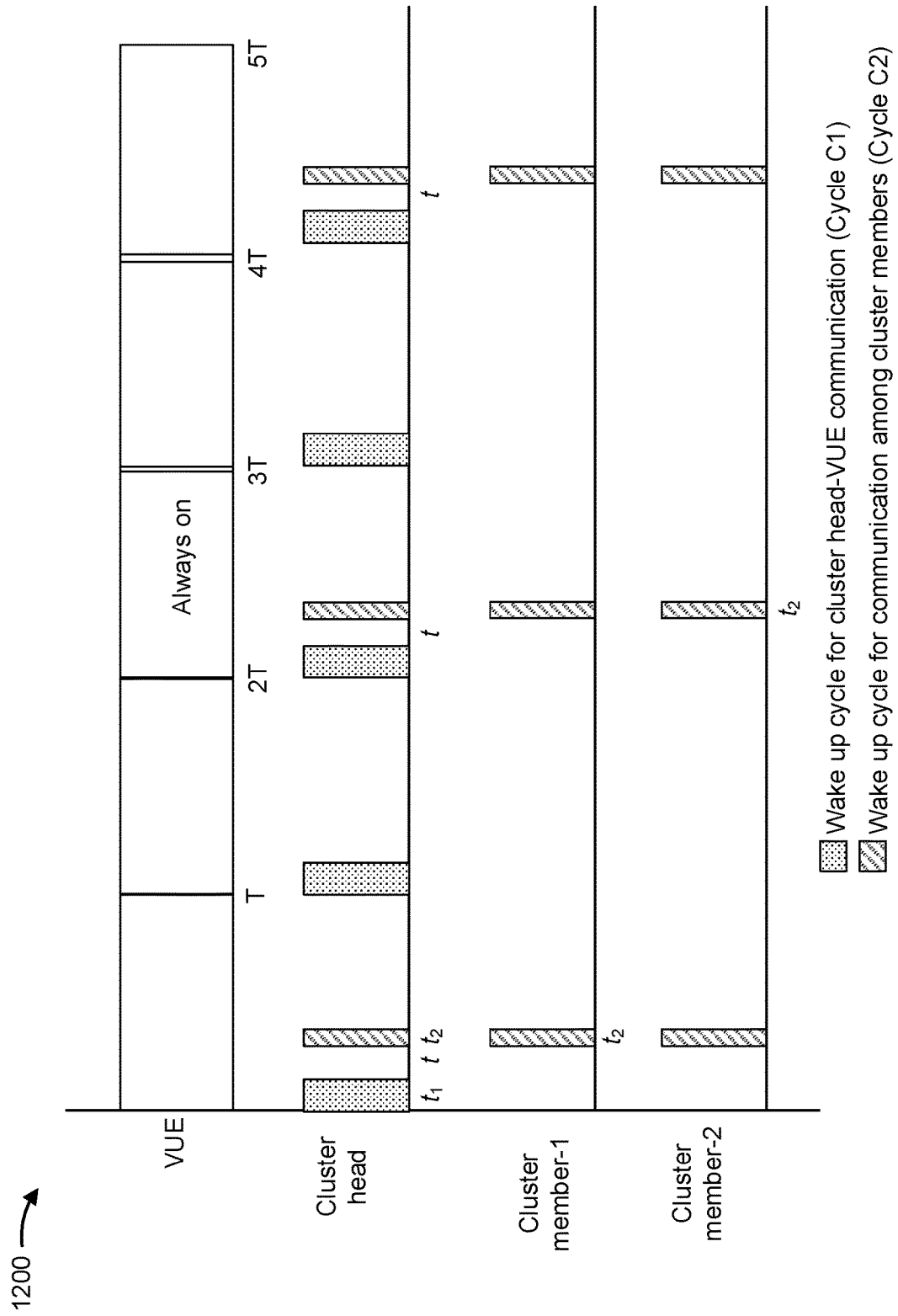

FIG. 12 is a diagram illustrating an example 1200 associated with position message update rate adaptation for vehicle-to-pedestrian communications, in accordance with various aspects of the present disclosure. Example 1200 depicts TRX/DRX cycles associated with members of a cluster and a VUE. The cluster head may communicate with the VUE based on a particular TRX/DRX cycle as shown (cycle C1). For example, as shown, $t_1$ slots may be allocated for VUE-cluster head communications every T slots. Communication among cluster members may be based on TRX/DRX cycle (cycle C2). That is, $t_2$ slots may be allocated every T slots for communication among members.

As shown in FIG. 12, cycles C1 and C2 may be independent, in which case there may be a time gap t>0 between $t_1$, $t_2$. In this case, the cluster head may perform RF cool down after communication with VUE (e.g., cycle C1), and perform warm up before waking up for communication among cluster members (e.g., cycle C2). In this way, aspects may facilitate increasing power efficiency of the cluster head.

As indicated above, FIG. 12 is provided as an example. Other examples may differ from what is described with respect to FIG. 12.

Figure 13:
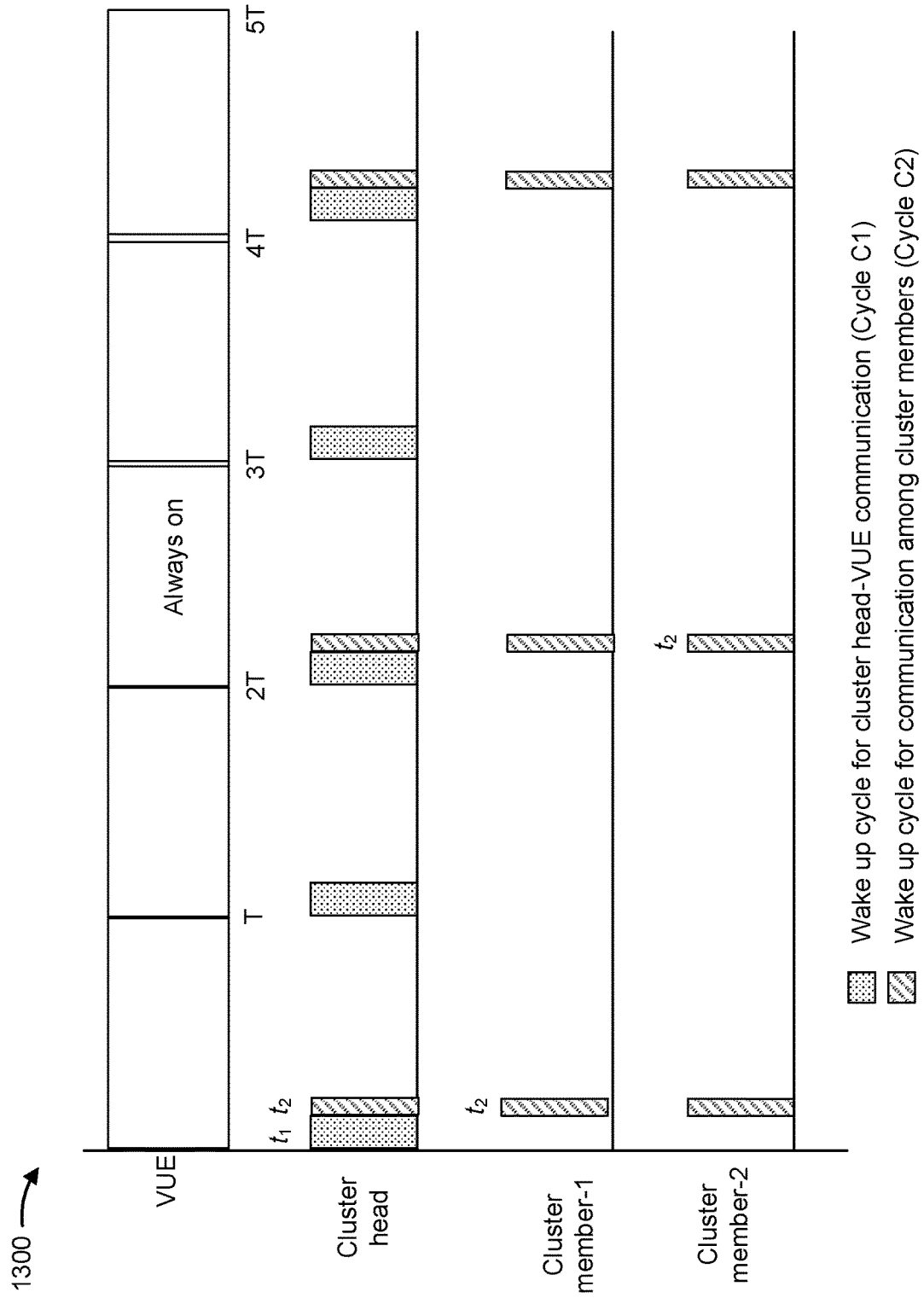

FIG. 13 is a diagram illustrating an example 1300 associated with position message update rate adaptation for vehicle-to-pedestrian communications, in accordance with various aspects of the present disclosure. Example 1200 depicts TRX/DRX cycles associated with members of a cluster and a VUE in which the TRX/DRX cycles C1 and C2 are contiguous. For example, the cluster head can continue to be in an ON state after cycle C1, so as to perform communication with cluster members in cycle C2. Here, the additional RF cool down after cycle C1 and warm up before cycle C2 may be avoided.

As indicated above, FIG. 13 is provided as an example. Other examples may differ from what is described with respect to FIG. 13.

Figure 14:
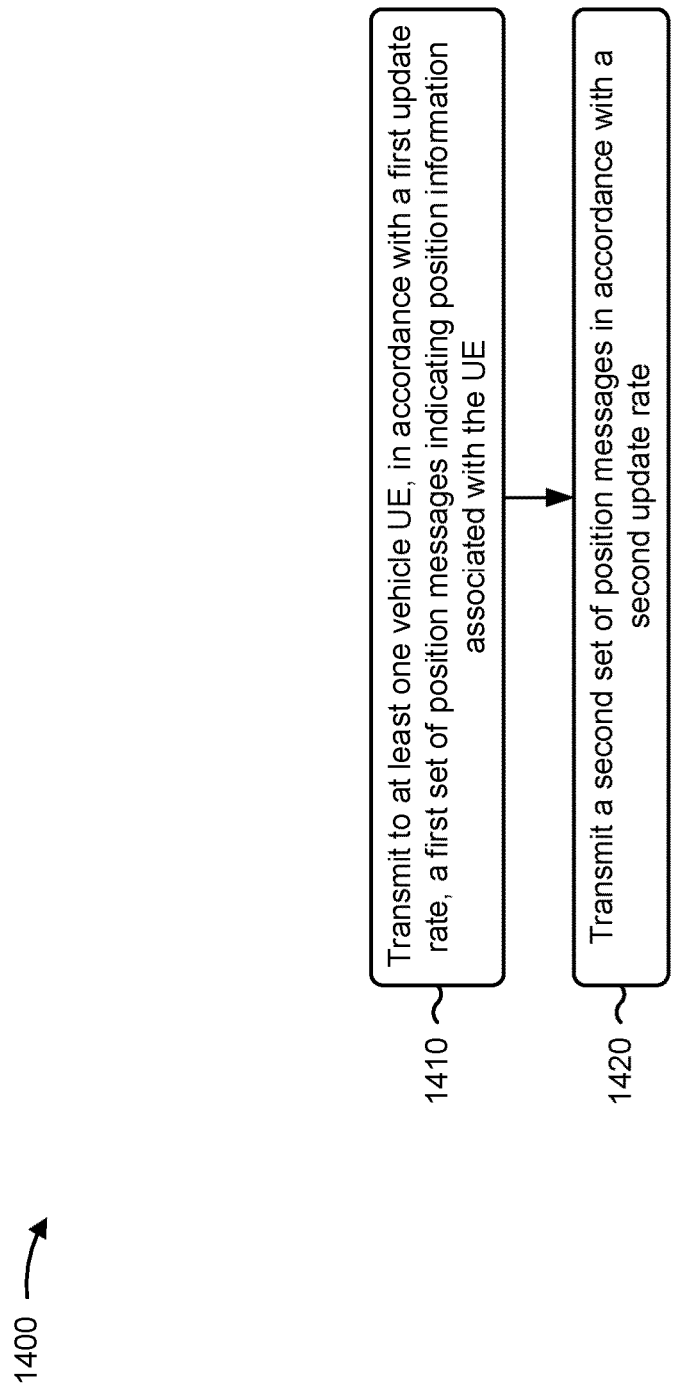
FIGS. 14-18 are diagrams illustrating example processes associated with position message update rate adaptation for vehicle-to-pedestrian communications, in accordance with various aspects of the present disclosure.

FIG. 14 is a diagram illustrating an example process 1400 performed, for example, by an apparatus for wireless communication at a UE, in accordance with various aspects of the present disclosure. Example process 1400 is an example where the apparatus (e.g., an apparatus associated with PUE 705) performs operations associated with position message update rate adaptation for vehicle-to-pedestrian communications.

As shown in FIG. 14, in some aspects, process 1400 may include transmitting to at least one vehicle UE, in accordance with a first update rate, a first set of position messages indicating position information associated with the UE (block 1410). For example, the apparatus (e.g., using transmission component 1904, depicted in FIG. 19) may transmit to at least one vehicle UE, in accordance with a first update rate, a first set of position messages indicating position information associated with the UE, as described above.

As further shown in FIG. 14, in some aspects, process 1400 may include transmitting a second set of position messages in accordance with a second update rate (block 1420). For example, the apparatus (e.g., using transmission component 1904, depicted in FIG. 19) may transmit a second set of position messages in accordance with a second update rate, as described above.

Process 1400 may include additional aspects, such as any single aspect or any combination of aspects described below and/or in connection with one or more other processes described elsewhere herein.

In some aspects, process 1400 includes determining the second update rate based at least in part on position information associated with one or more vehicles.

In some aspects, process 1400 includes receiving the position information associated with the one or more vehicles from the one or more vehicles.

In some aspects, process 1400 includes receiving the position information associated with the one or more vehicles from a roadside unit.

In some aspects, process 1400 includes receiving environmental information associated with the one or more vehicles from a roadside unit, wherein determining the second update rate comprises determining the second update rate based at least in part on the environmental information.

In some aspects, process 1400 includes receiving, from the at least one vehicle UE, at least one update rate request message indicating at least one requested minimum update rate, and determining the second update rate based at least in part on the at least one requested minimum update rate.

With respect to process 1400, in some aspects, receiving the at least one update rate request message comprises receiving, from a first vehicle UE, a first update rate request message indicating a first minimum update rate, receiving, from a second vehicle UE, a second update rate request message indicating a second minimum update rate, and determining the second update rate based at least in part on the first minimum update rate and the second minimum update rate.

With respect to process 1400, in some aspects, the second update rate comprises a maximum of the first minimum update rate and the second minimum update rate.

With respect to process 1400, in some aspects, transmitting the second set of position messages comprises broadcasting a plurality of public safety messages.

In some aspects, process 1400 includes receiving, from a roadside unit, an indication of the second update rate, wherein transmitting the second set of position messages in accordance with the second update rate comprises transmitting the second set of position messages in accordance with the second update rate based at least in part on receiving the indication of the second update rate.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
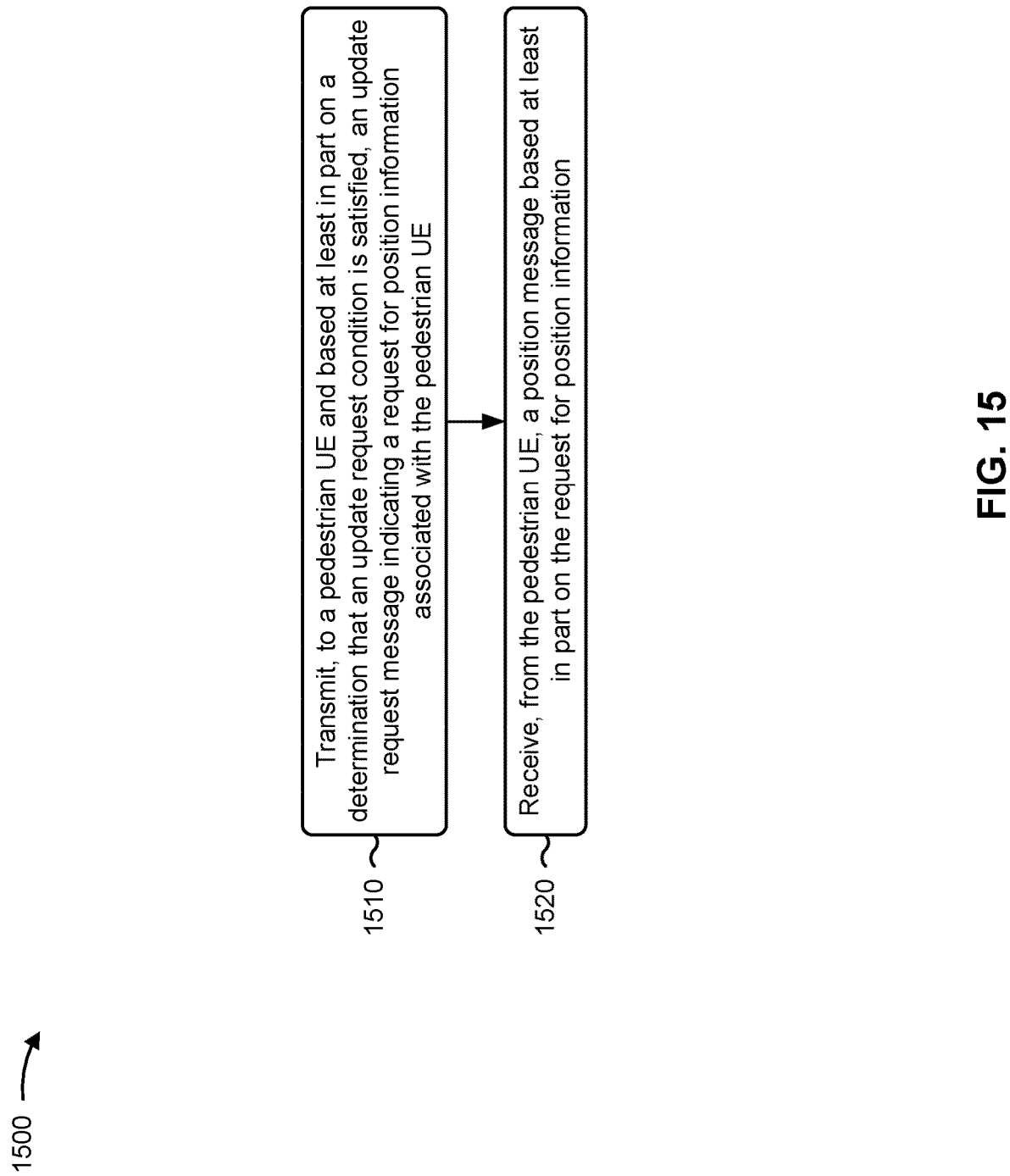

FIG. 15 is a diagram illustrating an example process 1500 performed, for example, by an apparatus for wireless communication at a UE, in accordance with various aspects of the present disclosure. Example process 1500 is an example where the apparatus (e.g., an apparatus associated with UE 905 of FIG. 9) performs operations associated with position message update rate adaptation for vehicle-to-pedestrian communications.

As shown in FIG. 15, in some aspects, process 1500 may include transmitting, to a pedestrian UE and based at least in part on a determination that an update request condition is satisfied, an update request message indicating a request for position information associated with the pedestrian UE (block 1510). For example, the apparatus (e.g., using transmission component 1904, depicted in FIG. 19) may transmit, to a pedestrian UE and based at least in part on a determination that an update request condition is satisfied, an update request message indicating a request for position information associated with the pedestrian UE, as described above.

As further shown in FIG. 15, in some aspects, process 1500 may include receiving, from the pedestrian UE, a position message based at least in part on the request for position information (block 1520). For example, the apparatus (e.g., using reception component 1902, depicted in FIG. 19) may receive, from the pedestrian UE, a position message based at least in part on the request for position information, as described above.

Process 1500 may include additional aspects, such as any single aspect or any combination of aspects described below and/or in connection with one or more other processes described elsewhere herein.

In some aspects, process 1500 includes determining a predicted path of the UE, determining a predicted location of the pedestrian UE, and determining that the predicted location of the pedestrian UE intersects the predicted path of the UE, wherein determining that the update request condition is satisfied comprises determining that the update request condition is satisfied based at least in part on determining that the predicted location of the pedestrian UE intersects the predicted path of the UE.

With respect to process 1500, in some aspects, the predicted location of the pedestrian UE comprises a location estimate and a confidence region surrounding the location estimate.

With respect to process 1500, in some aspects, determining the predicted location of the pedestrian UE comprises receiving, from a roadside unit, an indication of the predicted location of the pedestrian UE.

With respect to process 1500, in some aspects, receiving the position message comprises receiving a broadcast message.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
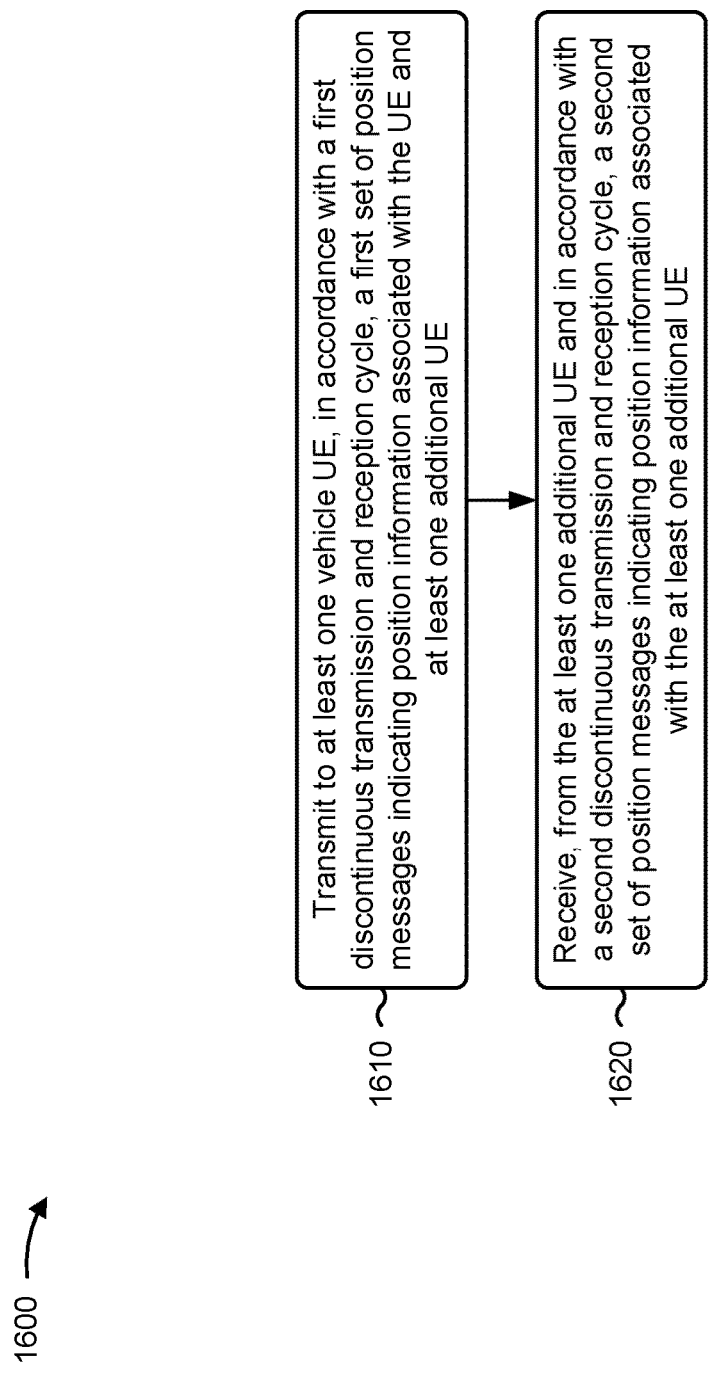

FIG. 16 is a diagram illustrating an example process 1600 performed, for example, by an apparatus, in accordance with various aspects of the present disclosure. Example process 1600 is an example where the apparatus (e.g., an apparatus associated with UE 1105 of FIG. 11) performs operations associated with position message update rate adaptation for vehicle-to-pedestrian communications.

As shown in FIG. 16, in some aspects, process 1600 may include transmitting to at least one vehicle UE, in accordance with a first discontinuous transmission and reception cycle, a first set of position messages indicating position information associated with the UE and at least one additional UE (block 1610). For example, the apparatus (e.g., using transmission component 1904, depicted in FIG. 19) may transmit to at least one vehicle UE, in accordance with a first discontinuous transmission and reception cycle, a first set of position messages indicating position information associated with the UE and at least one additional UE, as described above.

As further shown in FIG. 16, in some aspects, process 1600 may include receiving, from the at least one additional UE and in accordance with a second discontinuous transmission and reception cycle, a second set of position messages indicating position information associated with the at least one additional UE (block 1620). For example, the apparatus (e.g., using reception component 1902, depicted in FIG. 19) may receive, from the at least one additional UE and in accordance with a second discontinuous transmission and reception cycle, a second set of position messages indicating position information associated with the at least one additional UE, as described above.

Process 1600 may include additional aspects, such as any single aspect or any combination of aspects described below and/or in connection with one or more other processes described elsewhere herein.

In some aspects, process 1600 includes determining that the UE is a cluster head for a cluster of UEs that includes the UE and the at least one additional UE.

In some aspects, process 1600 includes receiving at least one status indication from the at least one additional UE, and identifying the cluster of UEs based at least in part on the at least one status indication.

With respect to process 1600, in some aspects, the at least one status indication is carried in at least one broadcast public safety message.

In some aspects, process 1600 includes receiving at least one status prediction from a roadside unit, and identifying the cluster of UEs based at least in part on the at least one status prediction.

In some aspects, process 1600 includes receiving at least one clustering signal from the at least one additional UE, and identifying the cluster of UEs based at least in part on the at least one clustering signal.

In some aspects, process 1600 includes receiving at least one position message from the at least one additional UE, and identifying the cluster of UEs based at least in part on the at least one position message.

In some aspects, process 1600 includes determining one or more UE IDs corresponding to the at least one additional UE, and determining that a UE ID corresponding to the UE has a value that is greater than a value of any of the one or more UE IDs, wherein determining that the UE is a cluster head for the cluster of UEs comprises determining that the UE is a cluster head for the cluster of UEs based at least in part on determining that the UE ID corresponding to the UE has a value that is greater than the value of any of the one or more UE IDs.

With respect to process 1600, in some aspects, the first discontinuous transmission and reception cycle corresponds to a first resource allocation indicating a first set of periodic slots that occur based on a first periodicity, and the second discontinuous transmission and reception cycle corresponds to a second resource allocation indicating a second set of periodic slots that occur based on a second periodicity.

With respect to process 1600, in some aspects, the first discontinuous transmission and reception cycle is independent of the second discontinuous transmission and reception cycle.

With respect to process 1600, in some aspects, the first discontinuous transmission and reception cycle and the second discontinuous transmission and reception cycle are contiguous so that there is no gap between an end of a first active state corresponding to the first discontinuous transmission and reception cycle and a beginning of a second, adjacent, active state corresponding to the second discontinuous transmission and reception cycle.

With respect to process 1600, in some aspects, the second periodicity is a multiple of the first periodicity.

With respect to process 1600, in some aspects, the second periodicity is two times the first periodicity.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
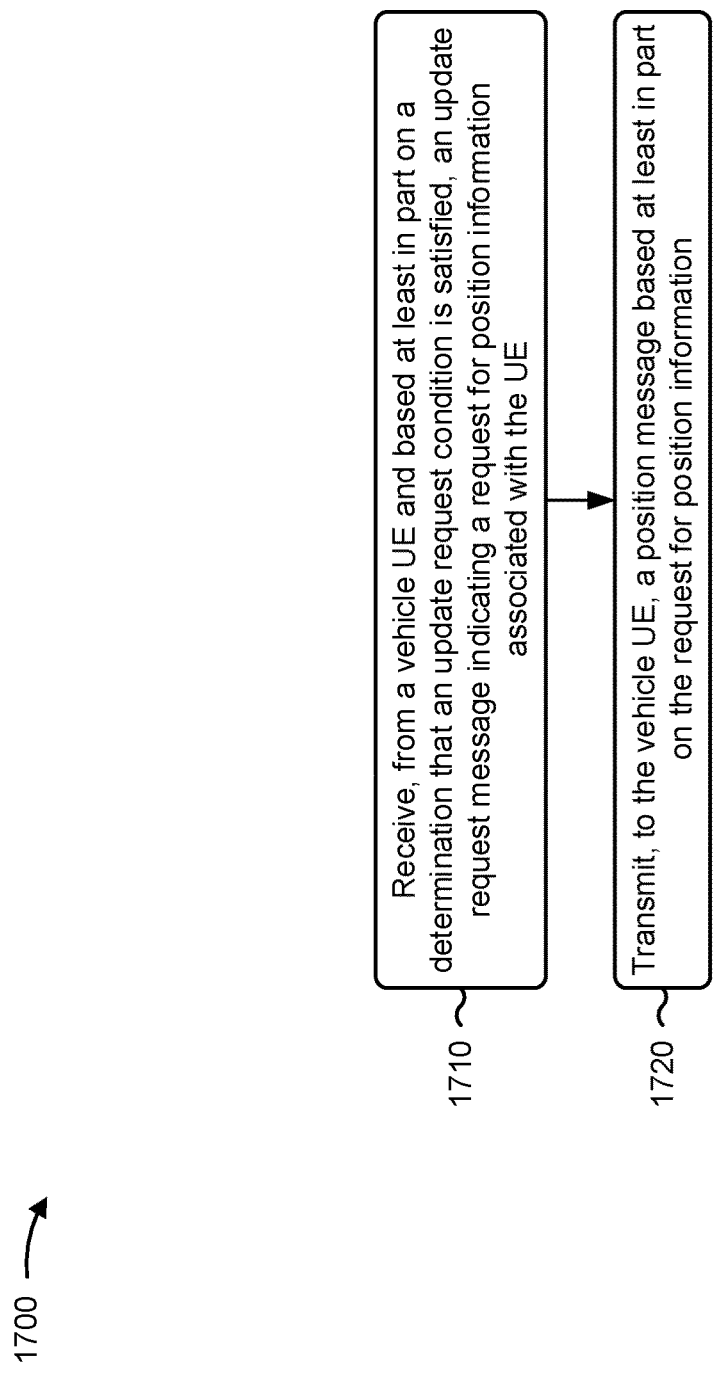

FIG. 17 is a diagram illustrating an example process 1700 performed, for example, by an apparatus for wireless communication at a UE, in accordance with various aspects of the present disclosure. Example process 1700 is an example where the apparatus (e.g., an apparatus associated with UE 910 in FIG. 9) performs operations associated with position message update rate adaptation for vehicle-to-pedestrian communications.

As shown in FIG. 17, in some aspects, process 1700 may include receiving, from a vehicle UE and based at least in part on a determination that an update request condition is satisfied, an update request message indicating a request for position information associated with the UE (block 1710). For example, the apparatus (e.g., using reception component 1902, depicted in FIG. 19) may receive, from a vehicle UE and based at least in part on a determination that an update request condition is satisfied, an update request message indicating a request for position information associated with the UE, as described above.

As further shown in FIG. 17, in some aspects, process 1700 may include transmitting, to the vehicle UE, a position message based at least in part on the request for position information (block 1720). For example, the apparatus (e.g., using transmission component 1904, depicted in FIG. 19) may transmit, to the vehicle UE, a position message based at least in part on the request for position information, as described above.

Process 1700 may include additional aspects, such as any single aspect or any combination of aspects described below and/or in connection with one or more other processes described elsewhere herein.

With respect to process 1700, in some aspects, the determination that the update request condition is satisfied is based at least in part on a determination that a predicted location of the UE intersects a predicted path of the vehicle UE.

With respect to process 1700, in some aspects, the predicted location of the UE comprises a location estimate and a confidence region surrounding the location estimate.

With respect to process 1700, in some aspects, transmitting the position message comprises transmitting a broadcast message.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
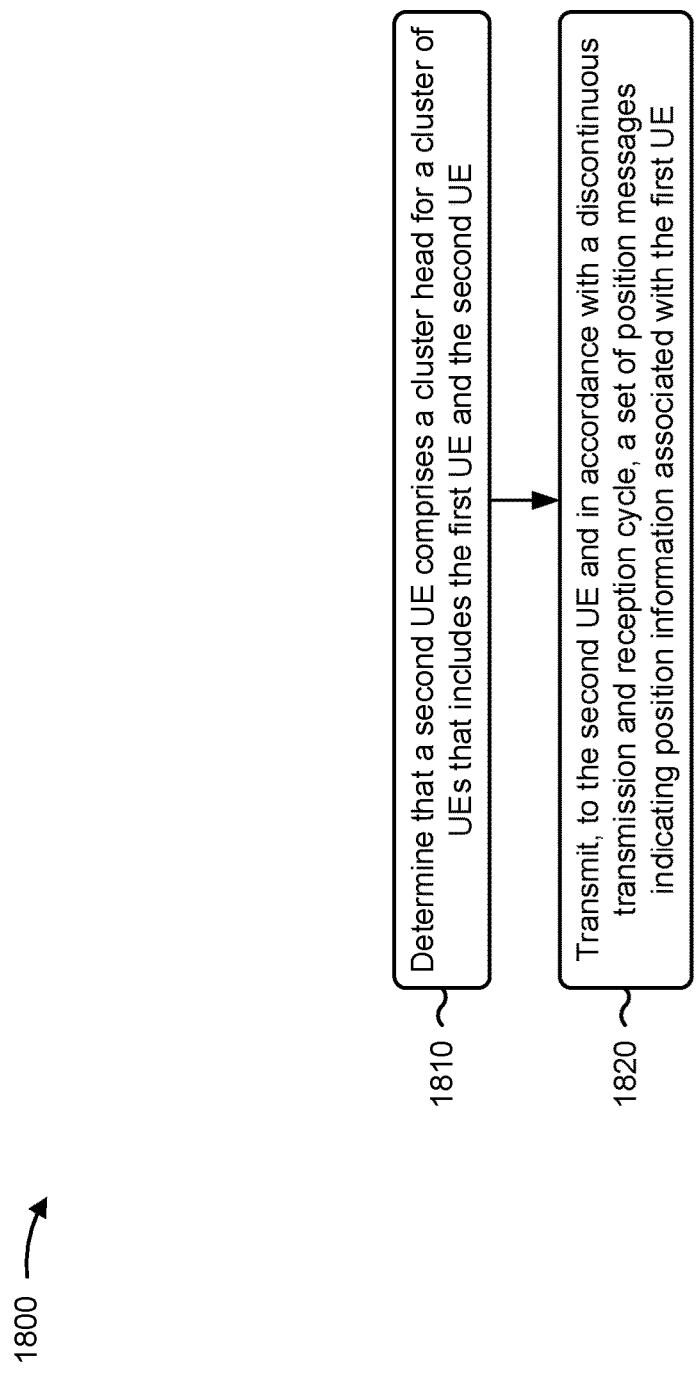

FIG. 18 is a diagram illustrating an example process 1800 performed, for example, by a first apparatus for wireless communication at a first UE, in accordance with various aspects of the present disclosure. Example process 1800 is an example where the first apparatus (e.g., an apparatus associated with 1115 in FIG. 11) performs operations associated with position message update rate adaptation for vehicle-to-pedestrian communications.

As shown in FIG. 18, in some aspects, process 1800 may include determining that a second UE comprises a cluster head for a cluster of UEs that includes the first UE and the second UE (block 1810). For example, the first apparatus (e.g., using determination component 1908, depicted in FIG. 1900) may determine that a second UE comprises a cluster head for a cluster of UEs that includes the first UE and the second UE, as described above.

As further shown in FIG. 18, in some aspects, process 1800 may include transmitting, to the second UE and in accordance with a discontinuous transmission and reception cycle, a set of position messages indicating position information associated with the first UE (block 1820). For example, the first apparatus (e.g., using transmission component 1904, depicted in FIG. 19) may transmit, to the second UE and in accordance with a discontinuous transmission and reception cycle, a set of position messages indicating position information associated with the first UE, as described above.

Process 1800 may include additional aspects, such as any single aspect or any combination of aspects described below and/or in connection with one or more other processes described elsewhere herein.

In some aspects, process 1800 includes receiving at least one status indication from the second UE, and identifying the cluster of UEs based at least in part on the at least one status indication.

With respect to process 1800, in some aspects, the at least one status indication is carried in at least one broadcast public safety message.

In some aspects, process 1800 includes receiving at least one status prediction from a roadside unit, and identifying the cluster of UEs based at least in part on the at least one status prediction.

In some aspects, process 1800 includes receiving at least one clustering signal from the second UE, and identifying the cluster of UEs based at least in part on the at least one clustering signal.

In some aspects, process 1800 includes receiving at least one position message from the second UE, and identifying the cluster of UEs based at least in part on the at least one position message.

In some aspects, process 1800 includes determining a first UE identifier (ID) corresponding to the first UE, determining a second UE ID corresponding to the second UE, and determining that the second UE ID has a value that is greater than a value of the first UE ID, wherein determining that the second UE is a cluster head for the cluster of UEs comprises determining that the UE is a cluster head for the cluster of UEs based at least in part on determining that the second UE ID has a value that is greater than a value of the first UE ID.

With respect to process 1800, in some aspects, the discontinuous transmission and reception cycle corresponds to a resource allocation indicating a set of periodic slots that occur based on a periodicity.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
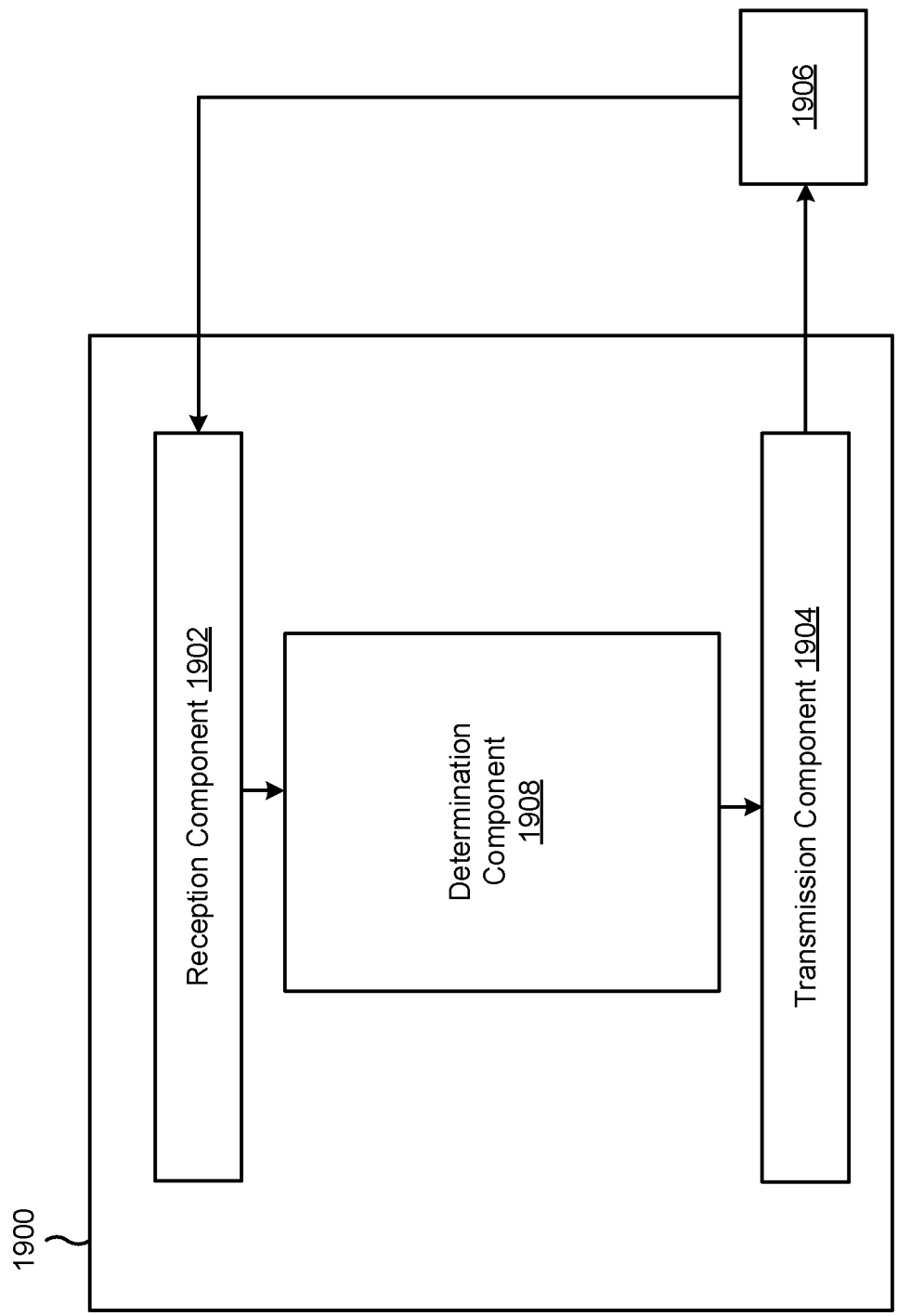
FIG. 19 is a block diagram of an example apparatus for wireless communication, in accordance with various aspects of the present disclosure.

FIG. 19 is a block diagram of an example apparatus 1900 for wireless communication. The apparatus 1900 may be a UE, or a UE may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include a determination component 1908.

In some aspects, the apparatus 1900 may be configured to perform one or more operations described herein in connection with FIGS. 7-13. Additionally, or alternatively, the apparatus 1900 may be configured to perform one or more processes described herein, such as process 1400 of FIG. 14, process 1500 of FIG. 15, process 1600 of FIG. 16, process 1700 of FIG. 17, process 1800 of FIG. 18, or a combination thereof. In some aspects, the apparatus 1900 and/or one or more components shown in FIG. 19 may include one or more components of the UE described above in connection with FIG. 2. Additionally, or alternatively, one or more components shown in FIG. 19 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1906. In some aspects, the reception component 1902 may include one or more antennas, a demodulator, a MIMO detector, a receive processor, a controller/processor, a memory, or a combination thereof, of the UE described above in connection with FIG. 2.

The transmission component 1904 may transmit communications, such as reference signals, control information, data communications, or a combination thereof, to the apparatus 1906. In some aspects, one or more other components of the apparatus 1906 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the UE described above in connection with FIG. 2. In some aspects, the transmission component 1904 may be co-located with the reception component 1902 in a transceiver.

The transmission component 1904 may transmit to at least one vehicle UE, in accordance with a first update rate, a first set of position messages indicating position information associated with the UE. The transmission component 1904 may transmit a second set of position messages in accordance with a second update rate.

The determination component 1908 may determine the second update rate.

The reception component 1902 may receive the position information associated with the one or more vehicles from the one or more vehicles. The reception component 1902 may receive the position information associated with the one or more vehicles from a roadside unit. The reception component 1902 may receive environmental information associated with the one or more vehicles from a roadside unit, wherein determining the second update rate comprises determining the second update rate based at least in part on the environmental information. The reception component 1902 may receive, from the at least one vehicle UE, at least one update rate request message indicating at least one requested minimum update rate.

The reception component 1902 may receive, from a roadside unit, an indication of the second update rate, wherein transmitting the second set of position messages in accordance with the second update rate comprises transmitting the second set of position messages in accordance with the second update rate based at least in part on receiving the indication of the second update rate.

The transmission component 1904 may transmit, to a pedestrian UE and based at least in part on a determination that an update request condition is satisfied, an update request message indicating a request for position information associated with the pedestrian UE. The reception component 1902 may receive, from the pedestrian UE, a position message based at least in part on the request for position information.

The determination component 1908 may determine a predicted path of the UE and/or a predicted location of the pedestrian UE. The determination component 908 may determine that the predicted location of the pedestrian UE intersects the predicted path of the UE wherein determining that the update request condition is satisfied comprises determining that the update request condition is satisfied based at least in part on determining that the predicted location of the pedestrian UE intersects the predicted path of the UE.

The transmission component 1904 may transmit to at least one vehicle UE, in accordance with a first discontinuous transmission and reception cycle, a first set of position messages indicating position information associated with the UE and at least one additional UE. The reception component 1902 may receive, from the at least one additional UE and in accordance with a second discontinuous transmission and reception cycle, a second set of position messages indicating position information associated with the at least one additional UE.

The determination component 1908 may identify a cluster of UEs and/or determine that the UE is a cluster head for a cluster of UEs that includes the UE and the at least one additional UE. The reception component 1902 may receive at least one status indication from the at least one additional UE. The reception component 1902 may receive at least one status prediction from a roadside unit. The reception component 1902 may receive at least one clustering signal from the at least one additional UE. The reception component 1902 may receive at least one position message from the at least one additional UE.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The following provides an overview of aspects of the present disclosure:

Aspect 1: A method of wireless communication performed by an apparatus for wireless communication at a user equipment (UE), comprising: transmitting to at least one vehicle UE, in accordance with a first update rate, a first set of position messages indicating position information associated with the UE; and transmitting a second set of position messages in accordance with a second update rate.

Aspect 2: The method of aspect 1, further comprising determining the second update rate based at least in part on position information associated with one or more vehicles.

Aspect 3: The method of aspect 2, further comprising receiving the position information associated with the one or more vehicles from the one or more vehicles.

Aspect 4: The method of either of aspects 2 or 3, further comprising receiving the position information associated with the one or more vehicles from a roadside unit.

Aspect 5: The method of any of aspects 2-4, further comprising receiving environmental information associated with the one or more vehicles from a roadside unit, wherein determining the second update rate comprises determining the second update rate based at least in part on the environmental information.

Aspect 6: The method of any of aspects 1-5, further comprising: receiving, from the at least one vehicle UE, at least one update rate request message indicating at least one requested minimum update rate; and determining the second update rate based at least in part on the at least one requested minimum update rate.

Aspect 7: The method of any of aspects 1-5, wherein receiving the at least one update rate request message comprises: receiving, from a first vehicle UE, a first update rate request message indicating a first minimum update rate; receiving, from a second vehicle UE, a second update rate request message indicating a second minimum update rate; and determining the second update rate based at least in part on the first minimum update rate and the second minimum update rate.

Aspect 8: The apparatus of aspect 7, wherein the second update rate comprises a maximum of the first minimum update rate and the second minimum update rate.

Aspect 10: The method of any of aspects 1-9, further comprising receiving, from a roadside unit, an indication of the second update rate, wherein transmitting the second set of position messages in accordance with the second update rate comprises transmitting the second set of position messages in accordance with the second update rate based at least in part on receiving the indication of the second update rate.

Aspect 11: A method of wireless communication performed by an apparatus for wireless communication at a UE, comprising: transmitting, to a pedestrian UE and based at least in part on a determination that an update request condition is satisfied, an update request message indicating a request for position information associated with the pedestrian UE; and receiving, from the pedestrian UE, a position message based at least in part on the request for position information.

Aspect 12: The method of aspect 11, further comprising: determining a predicted path of the UE; determining a predicted location of the pedestrian UE; and determining that the predicted location of the pedestrian UE intersects the predicted path of the UE, wherein determining that the update request condition is satisfied comprises determining that the update request condition is satisfied based at least in part on determining that the predicted location of the pedestrian UE intersects the predicted path of the UE.

Aspect 13: The method of aspect 12, wherein the predicted location of the pedestrian UE comprises a location estimate and a confidence region surrounding the location estimate.

Aspect 14: The method of either of aspects 12 or 13, wherein determining the predicted location of the pedestrian UE comprises receiving, from a roadside unit, an indication of the predicted location of the pedestrian UE.

Aspect 15: The method of any of aspects 11-14, wherein receiving the position message comprises receiving a broadcast message.

Aspect 16: A method of wireless communication performed by an apparatus for wireless communication at a user equipment (UE), comprising: transmitting to at least one vehicle UE, in accordance with a first discontinuous transmission and reception cycle, a first set of position messages indicating position information associated with the UE and at least one additional UE; and receiving, from the at least one additional UE and in accordance with a second discontinuous transmission and reception cycle, a second set of position messages indicating position information associated with the at least one additional UE.

Aspect 17: The method of aspect 16, further comprising determining that the UE is a cluster head for a cluster of UEs that includes the UE and the at least one additional UE.

Aspect 18: The method of aspect 17, further comprising: receiving at least one status indication from the at least one additional UE; and identifying the cluster of UEs based at least in part on the at least one status indication.

Aspect 19: The method of aspect 18, wherein the at least one status indication is carried in at least one broadcast public safety message.

Aspect 20: The method of any of aspects 17-19, further comprising: receiving at least one status prediction from a roadside unit; and identifying the cluster of UEs based at least in part on the at least one status prediction.

Aspect 21: The method of any of aspects 17-20, further comprising: receiving at least one clustering signal from the at least one additional UE; and identifying the cluster of UEs based at least in part on the at least one clustering signal.

Aspect 22: The method of any of aspects 17-21, further comprising: receiving at least one position message from the at least one additional UE; and identifying the cluster of UEs based at least in part on the at least one position message.

Aspect 23: The method of any of aspects 17-22, further comprising: determining one or more UE identifiers (IDs) corresponding to the at least one additional UE; and determining that a UE ID corresponding to the UE has a value that is greater than a value of any of the one or more UE IDs, wherein determining that the UE is a cluster head for the cluster of UEs comprises determining that the UE is a cluster head for the cluster of UEs based at least in part on determining that the UE ID corresponding to the UE has a value that is greater than the value of any of the one or more UE IDs.

Aspect 24: The method of any of aspects 16-23, wherein the first discontinuous transmission and reception cycle corresponds to a first resource allocation indicating a first set of periodic slots that occur based on a first periodicity, and wherein the second discontinuous transmission and reception cycle corresponds to a second resource allocation indicating a second set of periodic slots that occur based on a second periodicity.

Aspect 25: The method of aspect 24, wherein the first discontinuous transmission and reception cycle is independent of the second discontinuous transmission and reception cycle.

Aspect 26: The method of aspect 24, wherein the first discontinuous transmission and reception cycle and the second discontinuous transmission and reception cycle are contiguous so that there is no gap between an end of a first active state corresponding to the first discontinuous transmission and reception cycle and a beginning of a second, adjacent, active state corresponding to the second discontinuous transmission and reception cycle.

Aspect 27: The method of either of aspects 24 or 26, wherein the second periodicity is a multiple of the first periodicity.

Aspect 28: The method of aspect 27, wherein the second periodicity is two times the first periodicity.

Aspect 29: A method of wireless communication performed by an apparatus for wireless communication at a UE, comprising: receiving, from a vehicle UE and based at least in part on a determination that an update request condition is satisfied, an update request message indicating a request for position information associated with the UE; and transmitting, to the vehicle UE, a position message based at least in part on the request for position information.

Aspect 30: The method of aspect 29, wherein the determination that the update request condition is satisfied is based at least in part on a determination that a predicted location of the UE intersects a predicted path of the vehicle UE.

Aspect 31: The method of aspect 30, wherein the predicted location of the UE comprises a location estimate and a confidence region surrounding the location estimate.

Aspect 32: The method of any of aspects 29-31, wherein transmitting the position message comprises transmitting a broadcast message.

Aspect 33: A method of wireless communication performed by a first apparatus for wireless communication at a first UE, comprising: determining that a second UE comprises a cluster head for a cluster of UEs that includes the first UE and the second UE; and transmitting, to the second UE and in accordance with a discontinuous transmission and reception cycle, a set of position messages indicating position information associated with the first UE.

Aspect 34: The method of aspect 33, further comprising: receiving at least one status indication from the second UE; and identifying the cluster of UEs based at least in part on the at least one status indication.

Aspect 35: The method of aspect 34, wherein the at least one status indication is carried in at least one broadcast public safety message.

Aspect 36: The method of any of aspects 33-35, further comprising: receiving at least one status prediction from a roadside unit; and identifying the cluster of UEs based at least in part on the at least one status prediction.

Aspect 37: The method of any of aspects 33-36, further comprising: receiving at least one clustering signal from the second UE; and identifying the cluster of UEs based at least in part on the at least one clustering signal.

Aspect 38: The method of any of aspects 33-37, further comprising: receiving at least one position message from the second UE; and identifying the cluster of UEs based at least in part on the at least one position message.

Aspect 39: The method of any of aspects 33-38, further comprising: determining a first UE identifier (ID) corresponding to the first UE; determining a second UE ID corresponding to the second UE; and determining that the second UE ID has a value that is greater than a value of the first UE ID, wherein determining that the second UE is a cluster head for the cluster of UEs comprises determining that the UE is a cluster head for the cluster of UEs based at least in part on determining that the second UE ID has a value that is greater than a value of the first UE ID.

Aspect 40: The method of any of aspects 33-39, wherein the discontinuous transmission and reception cycle corresponds to a resource allocation indicating a set of periodic slots that occur based on a periodicity.

Aspect 41: An apparatus for wireless communication at a device, comprising: a processor; memory coupled with the processor; and instructions stored in the memory and executable by the processor to cause the apparatus to perform the method of one or more aspects of aspects 1-10.

Aspect 42: An apparatus for wireless communication at a device, comprising: a processor; memory coupled with the processor; and instructions stored in the memory and executable by the processor to cause the apparatus to perform the method of one or more aspects of aspects 11-15.

Aspect 43: An apparatus for wireless communication at a device, comprising: a processor; memory coupled with the processor; and instructions stored in the memory and executable by the processor to cause the apparatus to perform the method of one or more aspects of aspects 16-28.

Aspect 44: An apparatus for wireless communication at a device, comprising: a processor; memory coupled with the processor; and instructions stored in the memory and executable by the processor to cause the apparatus to perform the method of one or more aspects of aspects 29-32.

Aspect 45: An apparatus for wireless communication at a device, comprising: a processor; memory coupled with the processor; and instructions stored in the memory and executable by the processor to cause the apparatus to perform the method of one or more aspects of aspects 33-40.

Aspect 46: A device for wireless communication, comprising a memory and one or more processors coupled to the memory, the memory and the one or more processors configured to perform the method of one or more aspects of aspects 1-10.

Aspect 47: A device for wireless communication, comprising a memory and one or more processors coupled to the memory, the memory and the one or more processors configured to perform the method of one or more aspects of aspects 11-15.

Aspect 48: A device for wireless communication, comprising a memory and one or more processors coupled to the memory, the memory and the one or more processors configured to perform the method of one or more aspects of aspects 16-28.

Aspect 49: A device for wireless communication, comprising a memory and one or more processors coupled to the memory, the memory and the one or more processors configured to perform the method of one or more aspects of aspects 29-32.

Aspect 50: A device for wireless communication, comprising a memory and one or more processors coupled to the memory, the memory and the one or more processors configured to perform the method of one or more aspects of aspects 33-40.

Aspect 51: An apparatus for wireless communication, comprising at least one means for performing the method of one or more aspects of aspects 1-10.

Aspect 52: An apparatus for wireless communication, comprising at least one means for performing the method of one or more aspects of aspects 11-15.

Aspect 53: An apparatus for wireless communication, comprising at least one means for performing the method of one or more aspects of aspects 16-28.

Aspect 54: An apparatus for wireless communication, comprising at least one means for performing the method of one or more aspects of aspects 29-32.

Aspect 55: An apparatus for wireless communication, comprising at least one means for performing the method of one or more aspects of aspects 33-40.

Aspect 56: A non-transitory computer-readable medium storing code for wireless communication, the code comprising instructions executable by a processor to perform the method of one or more aspects of aspects 1-10.

Aspect 56: A non-transitory computer-readable medium storing code for wireless communication, the code comprising instructions executable by a processor to perform the method of one or more aspects of aspects 11-15.

Aspect 57: A non-transitory computer-readable medium storing code for wireless communication, the code comprising instructions executable by a processor to perform the method of one or more aspects of aspects 16-28.

Aspect 58: A non-transitory computer-readable medium storing code for wireless communication, the code comprising instructions executable by a processor to perform the method of one or more aspects of aspects 29-32.

Aspect 59: A non-transitory computer-readable medium storing code for wireless communication, the code comprising instructions executable by a processor to perform the method of one or more aspects of aspects 33-40.

Aspect 60: A non-transitory computer-readable medium storing a set of instructions for wireless communication, the set of instructions comprising one or more instructions that, when executed by one or more processors of a device, cause the device to perform the method of one or more aspects of aspects 1-10.

Aspect 61: A non-transitory computer-readable medium storing a set of instructions for wireless communication, the set of instructions comprising one or more instructions that, when executed by one or more processors of a device, cause the device to perform the method of one or more aspects of aspects 11-15.

Aspect 62: A non-transitory computer-readable medium storing a set of instructions for wireless communication, the set of instructions comprising one or more instructions that, when executed by one or more processors of a device, cause the device to perform the method of one or more aspects of aspects 16-28.

Aspect 63: A non-transitory computer-readable medium storing a set of instructions for wireless communication, the set of instructions comprising one or more instructions that, when executed by one or more processors of a device, cause the device to perform the method of one or more aspects of aspects 29-32.

Aspect 64: A non-transitory computer-readable medium storing a set of instructions for wireless communication, the set of instructions comprising one or more instructions that, when executed by one or more processors of a device, cause the device to perform the method of one or more aspects of aspects 33-40.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE) for wireless communication, comprising:
a memory; and
one or more processors coupled to the memory, the one or more processors configured to:
transmit to one or more vehicle UEs, in accordance with a first update rate, a first set of position messages indicating position information associated with the UE; and
transmit a second set of position messages in accordance with a second update rate,
wherein the second update rate is based at least in part on at least one of:
position information and environmental information that are each associated with the one or more vehicle UEs, wherein the environmental information is received by the UE from a roadside unit, or
at least one requested minimum update rate indicated via at least one update rate request message received by the UE from the one or more vehicle UEs.

2. The apparatus of claim 1, wherein the one or more processors are further configured to determine the second update rate based at least in part on the position information associated with the one or more vehicle UEs.

3. The apparatus of claim 2, wherein the one or more processors are further configured to receive the position information associated with the one or more vehicle UEs from the one or more vehicle UEs.

4. The apparatus of claim 2, wherein the one or more processors are further configured to receive the position information associated with the one or more vehicle UEs from the roadside unit.

5. The apparatus of claim 1, wherein the one or more processors are further configured to determine the second update rate based at least in part on the environmental information.

6. The apparatus of claim 1, wherein the one or more processors are further configured to:
receive, from the one or more vehicle UEs, the at least one update rate request message indicating the at least one requested minimum update rate; and
determine the second update rate based at least in part on the at least one requested minimum update rate.

7. The apparatus of claim 6, wherein the one or more processors, when receiving the at least one update rate request message, are configured to:
receive, from a first vehicle UE of the one or more vehicle UEs, a first update rate request message indicating a first minimum update rate;
receive, from a second vehicle UE of the one or more vehicle UEs, a second update rate request message indicating a second minimum update rate; and
determine the second update rate based at least in part on the first minimum update rate and the second minimum update rate.

8. The apparatus of claim 7, wherein the second update rate comprises a maximum of the first minimum update rate and the second minimum update rate.

9. The apparatus of claim 1, wherein the one or more processors, when transmitting the second set of position messages, are configured to broadcast a plurality of public safety messages.

10. The apparatus of claim 1, wherein the one or more processors are further configured to receive, from the roadside unit, an indication of the second update rate,
wherein the one or more processors, when transmitting the second set of position messages in accordance with the second update rate, are configured to transmit the second set of position messages in accordance with the second update rate based at least in part on receiving the indication of the second update rate.

11. A method of wireless communication performed by an apparatus at a user equipment (UE), comprising:
transmitting to one or more vehicle UEs, in accordance with a first update rate, a first set of position messages indicating position information associated with the UE; and
transmitting a second set of position messages in accordance with a second update rate,
wherein the second update rate is based at least in part on at least one of:
position information and environmental information that a each associated with the one or more vehicle UEs, wherein the environmental information is received by the UE from a roadside unit, or
at least one requested minimum update rate indicated via at least one update rate request message received by the UE from the one or more vehicle UEs.

12. The method of claim 11, further comprising:
determining the second update rate based at least in part on the position information associated with the one or more vehicle UEs.

13. The method of claim 12, further comprising:
receiving the position information associated with the one or more vehicle UEs from the one or more vehicle UEs.

14. The method of claim 12, further comprising:
receiving the position information associated with the one or more vehicle UEs from the roadside unit.

15. The method of claim 11, further comprising:
determining the second update rate based at least in part on the environmental information.

16. The method of claim 11, further comprising:
receiving, from the one or more vehicle UEs, the at least one update rate request message indicating the at least one requested minimum update rate; and
determining the second update rate based at least in part on the at least one requested minimum update rate.

17. The method of claim 16, wherein receiving the at least one update rate request message comprises:
receiving, from a first vehicle UE of the one or more vehicle UEs, a first update rate request message indicating a first minimum update rate;
receiving, from a second vehicle UE of the one or more vehicle UEs, a second update rate request message indicating a second minimum update rate; and
determining the second update rate based at least in part on the first minimum update rate and the second minimum update rate.

18. The method of claim 17, wherein the second update rate comprises a maximum of the first minimum update rate and the second minimum update rate.

19. The method of claim 11, wherein transmitting the second set of position messages comprises broadcasting a plurality of public safety messages.

20. The method of claim 11, further comprising:
receiving, from the roadside unit, an indication of the second update rate,
wherein transmitting the second set of position messages in accordance with the second update rate comprises transmitting the second set of position messages in accordance with the second update rate based at least in part on receiving the indication of the second update rate.

21. A non-transitory computer-readable medium storing a set of instructions for wireless communication, the set of instructions comprising:
one or more instructions that, when executed by one or more processors of an apparatus at a user equipment (UE), cause the UE to:
transmit to one or more vehicle UEs, in accordance with a first update rate, a first set of position messages indicating position information associated with the UE; and
transmit a second set of position messages in accordance with a second update rate,
wherein the second update rate is based at least in part on at least one of:
position information and environmental information that are each associated with the one or more vehicle UEs, wherein the environmental information is received by the UE from a roadside unit, or
at least one requested minimum update rate indicated via at least one update rate request message received by the UE from the one or more vehicle UEs.

22. The non-transitory computer-readable medium of claim 21, wherein the one or more instructions further cause the UE to:
determine the second update rate based at least in part on the position information associated with the one or more vehicle UEs.

23. The non-transitory computer-readable medium of claim 22, wherein the one or more instructions further cause the UE to:
receive the position information associated with the one or more vehicle UEs from the one or more vehicle UEs.

24. The non-transitory computer-readable medium of claim 22, wherein the one or more instructions further cause the UE to:
receive the position information associated with the one or more vehicle UEs from the roadside unit.

25. The non-transitory computer-readable medium of claim 21, wherein the one or more instructions further cause the UE to:
determine the second update rate based at least in part on the environmental information.

26. The non-transitory computer-readable medium of claim 21, wherein the one or more instructions further cause the UE to:
receive, from the one or more vehicle UEs, the at least one update rate request message indicating the at least one requested minimum update rate; and
determine the second update rate based at least in part on the at least one requested minimum update rate.

27. The non-transitory computer-readable medium of claim 21, wherein the one or more instructions further cause the UE to:
receive, from a first vehicle UE of the one or more vehicle UEs, a first update rate request message indicating a first minimum update rate;
receive, from a second vehicle UE of the one or more vehicle UEs, a second update rate request message indicating a second minimum update rate; and
determine the second update rate based at least in part on the first minimum update rate and the second minimum update rate.

28. The non-transitory computer-readable medium of claim 27, wherein the second update rate comprises a maximum of the first minimum update rate and the second minimum update rate.

29. The non-transitory computer-readable medium of claim 21, wherein the one or more instructions further cause the UE to receive, from the roadside unit, an indication of the second update rate,
wherein the one or more instructions, that cause the UE to transmit the second set of position messages in accordance with the second update rate, cause the UE to transmit the second set of position messages in accordance with the second update rate based at least in part on receiving the indication of the second update rate.

30. An apparatus for wireless communication, comprising:
means for transmitting to one or more vehicle UEs, in accordance with a first update rate, a first set of position messages indicating position information associated with the apparatus; and
means for transmitting a second set of position messages in accordance with a second update rate,
wherein the second update rate is based at least in part on at least one of:
position information and environmental information that are each associated with the one or more vehicle UEs, wherein the environmental information is received by the apparatus from a roadside unit, or
at least one requested minimum update rate indicated via at least one update rate request message received by the apparatus from the one or more vehicle UEs.

* * * * *